(12) United States Patent
Kang

(10) Patent No.: US 11,416,410 B2
(45) Date of Patent: Aug. 16, 2022

(54) MEMORY SYSTEM, METHOD OF OPERATING THE SAME AND DATA PROCESSING SYSTEM FOR SUPPORTING ADDRESS TRANSLATION USING HOST RESOURCE

(71) Applicant: SK hynix Inc., Icheon (KR)

(72) Inventor: Hye-Mi Kang, Seongnam (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/709,702

(22) Filed: Dec. 10, 2019

(65) Prior Publication Data

US 2020/0327064 A1  Oct. 15, 2020

(30) Foreign Application Priority Data

Apr. 9, 2019 (KR) .................. 10-2019-0041418

(51) Int. Cl.
*G06F 12/0877* (2016.01)
*G06F 12/0873* (2016.01)
(Continued)

(52) U.S. Cl.
CPC ...... *G06F 12/0877* (2013.01); *G06F 12/0246* (2013.01); *G06F 12/0835* (2013.01);
(Continued)

(58) Field of Classification Search
CPC ......... G06F 12/12–128; G06F 12/0877; G06F 12/0246; G06F 12/0835; G06F 12/873; G06F 13/1668
See application file for complete search history.

(56) References Cited

U.S. PATENT DOCUMENTS

| 5,740,465 A | 4/1998 | Matsunami et al. |
| 6,553,511 B1 | 4/2003 | DeKoning et al. |

(Continued)

FOREIGN PATENT DOCUMENTS

| KR | 20170006427 A | 1/2017 |
| KR | 20170081126 A | 7/2017 |

OTHER PUBLICATIONS

"Differences between disk cache write-through and write-back" Huawei. Jun. 6, 2016. <https://forum.huawei.com/enterprise/en/differences-between-disk-cache-write-through-and-write-back/thread/203781-891>. (Year: 2016).*

(Continued)

*Primary Examiner* — Charles Rones
*Assistant Examiner* — Hewy H Li

(57) ABSTRACT

A memory system includes: a memory device suitable for storing map information; and a controller suitable for storing a portion of the map information in a map cache, and accessing the memory device based on the map information stored in the map cache or accessing the memory device based on a physical address that is selectively provided together with an access request from a host, wherein the map cache includes a write map cache suitable for storing map information corresponding to a write command, and a read map cache suitable for storing map information corresponding to a read command, and wherein the controller provides the host with map information that is outputted from the read map cache.

18 Claims, 18 Drawing Sheets

(51) Int. Cl.
*G06F 13/16* (2006.01)
*G06F 12/123* (2016.01)
*G06F 12/02* (2006.01)
*G06F 12/0831* (2016.01)

(52) U.S. Cl.
CPC ........ *G06F 12/0873* (2013.01); *G06F 12/123* (2013.01); *G06F 13/1668* (2013.01)

(56) References Cited

U.S. PATENT DOCUMENTS

| | | | |
|---|---|---|---|
| 6,996,676 B2 | 2/2006 | Megiddo et al. | |
| 7,549,034 B2 | 6/2009 | Foster, Sr. et al. | |
| 7,613,877 B2 | 11/2009 | Shimozono et al. | |
| 7,856,530 B1* | 12/2010 | Mu | G06F 12/0888 711/119 |
| 8,972,957 B2 | 3/2015 | Bates et al. | |
| 9,003,126 B2 | 4/2015 | Cai et al. | |
| 9,104,599 B2 | 8/2015 | Atkisson et al. | |
| 9,329,846 B1 | 5/2016 | August et al. | |
| 9,378,135 B2 | 6/2016 | Bennett | |
| 9,400,749 B1* | 7/2016 | Kuzmin | G06F 12/0246 |
| 9,703,664 B1 | 7/2017 | Alshawabkeh et al. | |
| 10,268,584 B2* | 4/2019 | Hahn | G06F 12/0868 |
| 10,783,071 B2 | 9/2020 | Wang et al. | |
| 2003/0041212 A1* | 2/2003 | C. Creta | G06F 12/0848 711/118 |
| 2005/0102297 A1 | 5/2005 | Lloyd et al. | |
| 2007/0118695 A1* | 5/2007 | Lowe | G06F 12/127 711/136 |
| 2007/0220201 A1* | 9/2007 | Gill | G06F 12/123 711/113 |
| 2009/0125548 A1 | 5/2009 | Moir et al. | |
| 2010/0088467 A1* | 4/2010 | Lee | G06F 12/0246 711/E12.001 |
| 2011/0093648 A1* | 4/2011 | Belluomini | G06F 12/0868 711/103 |
| 2012/0096225 A1* | 4/2012 | Khawand | G06F 12/0848 711/119 |
| 2012/0124294 A1 | 5/2012 | Atkisson et al. | |
| 2013/0124794 A1* | 5/2013 | Bux | G06F 12/0246 711/103 |
| 2013/0151777 A1 | 6/2013 | Daly et al. | |
| 2013/0151778 A1 | 6/2013 | Daly et al. | |
| 2013/0151780 A1 | 6/2013 | Daly et al. | |
| 2014/0047170 A1 | 2/2014 | Cohen et al. | |
| 2014/0173234 A1 | 6/2014 | Jung et al. | |
| 2014/0258638 A1* | 9/2014 | Traut | G06F 12/0866 711/135 |
| 2015/0301744 A1 | 10/2015 | Kim et al. | |
| 2015/0347028 A1 | 12/2015 | Kotte et al. | |
| 2015/0356020 A1* | 12/2015 | Desai | G06F 12/123 711/103 |
| 2015/0378925 A1* | 12/2015 | Misra | G06F 12/0815 711/141 |
| 2016/0147654 A1 | 5/2016 | Zhao et al. | |
| 2016/0267018 A1 | 9/2016 | Shimizu et al. | |
| 2016/0274797 A1* | 9/2016 | Hahn | G06F 3/061 |
| 2016/0299715 A1 | 10/2016 | Hashimoto et al. | |
| 2016/0371024 A1 | 12/2016 | Park et al. | |
| 2016/0378359 A1 | 12/2016 | Jang et al. | |
| 2017/0060202 A1 | 3/2017 | Sundaram et al. | |
| 2017/0109089 A1* | 4/2017 | Huang | G06F 3/0688 |
| 2017/0192902 A1 | 7/2017 | Hwang et al. | |
| 2017/0351452 A1* | 12/2017 | Boyd | G06F 12/02 |
| 2018/0067678 A1 | 3/2018 | Jeong et al. | |
| 2018/0088812 A1 | 3/2018 | Lee | |
| 2018/0101477 A1 | 4/2018 | Kan et al. | |
| 2018/0121121 A1* | 5/2018 | Mehra | G06F 12/0246 |
| 2019/0004591 A1 | 1/2019 | Park et al. | |
| 2019/0004944 A1 | 1/2019 | Widder et al. | |
| 2019/0042464 A1 | 2/2019 | Genshaft et al. | |
| 2019/0171575 A1 | 6/2019 | Chen et al. | |
| 2019/0265976 A1 | 8/2019 | Goryavskiy et al. | |
| 2019/0266079 A1 | 8/2019 | Raviraj et al. | |
| 2019/0272104 A1 | 9/2019 | Durnov et al. | |
| 2019/0294546 A1 | 9/2019 | Agarwal et al. | |
| 2020/0151108 A1 | 5/2020 | Yen et al. | |
| 2020/0278797 A1* | 9/2020 | Bavishi | G06F 3/0613 |
| 2020/0327063 A1 | 10/2020 | Kang et al. | |
| 2020/0334138 A1 | 10/2020 | Byun | |
| 2020/0334166 A1 | 10/2020 | Byun et al. | |

OTHER PUBLICATIONS

Notice of Allowance dated Mar. 19, 2021 for U.S. Appl. No. 16/717,144.
Yu Cai et al. "Error characterization, mitigation, and recovery in flash-memory-based solid-state drives." Proceedings of the IEEE, Aug. 18, 2017, pp. 1666-1704, vol. 105, No. 9.
Office Action dated Apr. 2, 2021 for related U.S. Appl. No. 16/844,652.
U.S. Office Action dated May 3, 2021 for related U.S. Appl. No. 16/842,416.
Office Action dated Aug. 18, 2021 for U.S. Appl. No. 16/837,764.
Notice of Allowance dated Jun. 10, 2021 for U.S. Appl. No. 16/717,144.
Office Action dated Oct. 7, 2021 for related U.S. Appl. No. 16/837,727.
Final Office Action dated Apr. 26, 2022 for U.S. Appl. No. 16/837,727.
Office Action dated May 13, 2022 for U.S. Appl. No. 16/842,416.

* cited by examiner

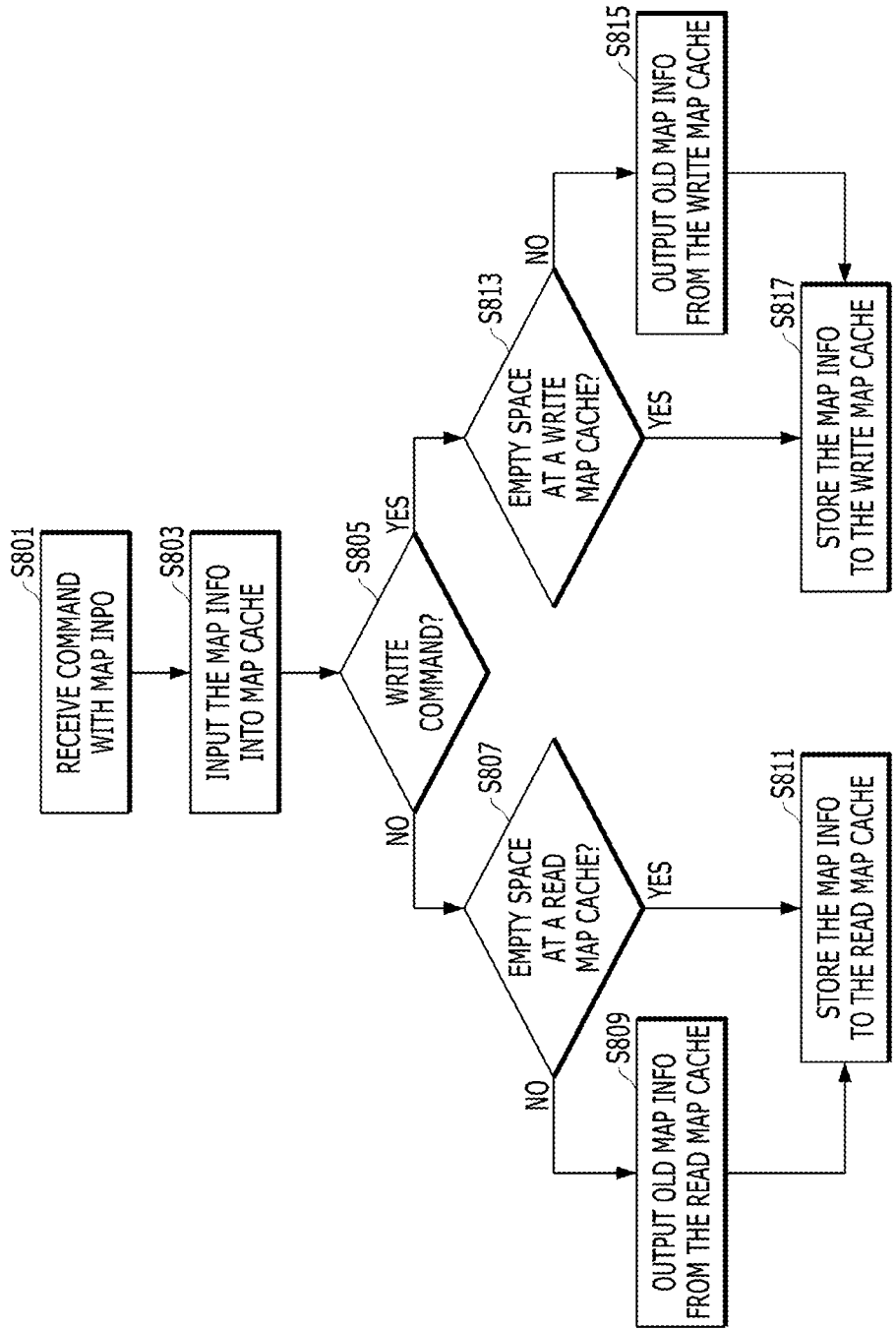

MEMORY SYSTEM, METHOD OF OPERATING THE SAME AND DATA PROCESSING SYSTEM FOR SUPPORTING ADDRESS TRANSLATION USING HOST RESOURCE

CROSS-REFERENCE TO RELATED APPLICATIONS

The present application claims priority of Korean Patent Application No. 10-2019-0041418, filed on Apr. 9, 2019, which is incorporated herein by reference in its entirety.

BACKGROUND

1. Field

Embodiments of the present disclosure relate to a memory system and a method of operating the same, and more particularly, to an apparatus and method for providing map information to a host or a computing device from a memory system included in a data processing system.

2. Description of the Related Art

The computer environment paradigm has shifted to ubiquitous computing, which enables computing systems to be used anytime and everywhere. As a result, use of portable electronic devices such as mobile phones, digital cameras, and laptop computers has rapidly increased. These portable electronic devices each use a memory system having one or more memory devices for storing data. A memory system may be used as a main memory system or an auxiliary memory system of a portable electronic device.

Since memory systems have no mechanical driving parts, they provide advantages such as excellent stability and durability, high information access speed, and low power consumption. Examples of the memory systems having such advantages include universal serial bus (USB) memory devices, memory cards having various interfaces, solid state drives (SSD), and so on.

SUMMARY

Embodiments of the present disclosure are directed to a memory system capable of efficiently processing data by using resources of a host, and a method of operating the memory system.

In accordance with an embodiment of the present invention, a memory system includes: a memory device suitable for storing map information; and a controller suitable for storing a portion of the map information in a map cache, and accessing the memory device based on the map information stored in the map cache or accessing the memory device based on a physical address that is selectively provided together with an access request from a host, wherein the map cache includes a write map cache suitable for storing map information corresponding to a write command, and a read map cache suitable for storing map information corresponding to a read command, and wherein the controller provides the host with map information that is outputted from the read map cache.

In accordance with another embodiment of the present invention, a method for operating a memory system includes: storing map information in a memory device; and storing a portion of the map information in a map cache; accessing the memory device based on the map information stored in the map cache or accessing the memory device based on a physical address that is selectively provided together with an access request from a host; storing map information corresponding to a write operation in a write map cache when the access request is for the write operation, and storing map information corresponding to a read operation in a read map cache when the access request is for the read operation; and providing the host with map information that is outputted from the read map cache.

In accordance with yet another embodiment of the present invention, a data processing system includes: a memory system suitable for storing map information and accessing user data based on the map information: and a host suitable for receiving the map information from the memory system, storing the received map information in a host memory, and providing the memory system with an access request based on the map information, wherein the memory system includes: a map cache; and a controller suitable for storing a portion of the map information, wherein the map cache includes a write map cache suitable for storing map information corresponding to a write command, and a read map cache suitable for storing map information corresponding to a read command, and wherein the controller provides the host with map information that is outputted from the read map cache.

BRIEF DESCRIPTION OF THE DRAWINGS

FIG. 8B is a flowchart describing an operation of processing map information by using a map cache in accordance with an embodiment of the present disclosure.

DETAILED DESCRIPTION

Figure 1:
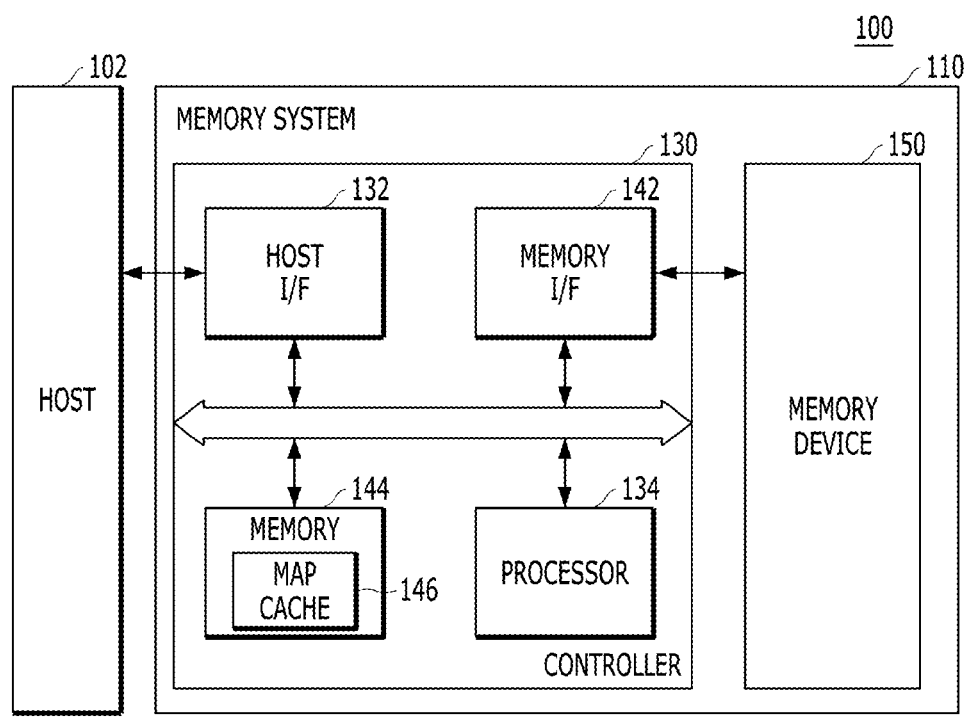
FIG. 1 illustrates a data processing system including a memory system in accordance with an embodiment of the present disclosure.

Exemplary embodiments of the present disclosure will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a data processing system 100 in accordance with an embodiment of the present disclosure.

Referring to FIG. 1, the data processing system 100 may include a host 102 and a memory system 110.

The host 102 may include any of various portable electronic devices or any of various non-portable electronic devices. The portable electronic devices may include a mobile phone, an MP3 player, a laptop computer, and so on, and the non-portable electronic devices may include a desktop computer, a game machine, a television (TV), a projector, and so on.

The host 102 may include at least one operating system (OS), which may manage and control overall functions and operations of the host 102, and provide an operation between the host 102 and a user using the data processing system 100 or the memory system 110. The OS may support functions and operations corresponding to the use purpose and usage of the user. For example, the OS may be divided into a general OS and a mobile OS depending on the mobility of the host 102. The general OS may be divided into a personal OS and an enterprise OS depending on the environment of the user.

The memory system 110 may operate to store data for the host 102 in response to a request of the host 102. The memory system 110 may include any of a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card, a memory stick, and so on. The MMC may include an embedded MMC (eMMC), a reduced size MMC (RS-MMC), a micro-MMC, or the like. The SD card may include a mini-SD card, a micro-SD card, or the like.

The memory system 110 may be implemented with various types of storage devices. Such storage devices may include, but are not limited to, volatile memory devices, such as a dynamic random access memory (DRAM) and a static RAM (SRAM), and nonvolatile memory devices, such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), a flash memory, and so on. The flash memory may have a 3-dimensional (3D) stack structure.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, an operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, a compact flash (CF) card, smart media (SM) card, a memory stick, a multimedia card (MMC) such as a reduced size MMC (RS-MMC) or a micro-MMC, a secure digital (SD) card including a mini-SD card, a micro-SD card, or an SDHC card, or a universal flash storage (UFS) device.

The memory device 150 may be a nonvolatile memory device that retains data stored therein even though power is not supplied. The memory device 150 may store data provided by the host 102 in a write operation, and provide data stored therein to the host 102 in a read operation. The memory device 150 may include a plurality of memory blocks each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided by the host 102 in the memory device 150. For this operation, the controller 130 may control read, program (or write), and erase operations of the memory device 150.

The controller 130 may include a host interface (I/F) 132, a processor 134, a memory I/F 142, and a memory 144.

The host I/F 132 may be configured to process a command and data of the host 102, and may communicate with the host 102 using one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), integrated drive electronics (IDE), and so on.

The host I/F 132 may be driven through firmware referred to as a host interface layer (HIL) in order to exchange data with the host 102.

The memory I/F 142 may serve as a memory/storage interface for interfacing the controller 130 and the memory device 150 such that the controller 130 controls the memory device 150 in response to a request from the host 102. When the memory device 150 is a flash memory, e.g., a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The processor 134 may control the overall operations of the memory system 110. The processor 134 may drive firmware to control the overall operations of the memory system 110. The firmware may be referred to as a flash translation layer (FTL). Also, the processor 134 may be implemented with a microprocessor or a central processing unit (CPU).

Also, the controller 130 may perform a background operation onto the memory device 150 through the use of the processor 134. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and store data for driving the memory system 110 and the controller 130.

The memory 144 may be embodied by a volatile memory. For example, the memory 144 may be embodied by a static random access memory (SRAM) or a dynamic random access memory (DRAM). The memory 144 may be disposed within or out of the controller 130. FIG. 1 exemplifies the memory 144 disposed within the controller 130. In another embodiment, the memory 144 may be embodied by an external volatile memory having a memory interface transferring data between the memory 144 and the controller 130.

As described above, the memory 144 may store data required for performing a data write/read operation between the host 102 and the memory device 150 and data when the data write/read operation is performed. In order to store such data, the memory 144 may include a program memory, a data memory, a write buffer/cache, a read buffer/cache, a data buffer/cache, a map buffer/cache, or the like.

FIG. 1 shows the memory 144 that includes a map cache 146. The map cache 146 may store map information. The map information may be used to map a logical address to a physical address. The map information will be described in detail with reference to FIG. 3. The map cache 146 may store the map information under the control of the processor 134. Since the map cache 146 has a limited storage space, it may store some of map information stored in the memory device 150. For example, the map cache 146 may store map information for recently processed data. In another example, the map cache 146 may store map information for data that is frequently processed. The map cache 146 may store the map information according to a first-in-first-out (FIFO) scheme.

Although not shown in the drawings, the controller 130 may further include an error correction code (ECC) unit and a power management unit (PMU).

The ECC unit may process data read from or data to be programmed in the memory device 150 in order to detect and correct a failure bit of data read from the memory device 150, and the ECC unit may include an ECC encoder and an ECC decoder.

The ECC encoder may perform an ECC encoding operation on the data to be programmed in the memory device 150 so as to generate a parity bit added to the data. The data and the parity bit may be stored in the memory device 150. The ECC decoder may detect and correct a failure bit included in the data read from the memory device 150 when reading the data stored in the memory device 150.

The ECC unit may perform error correction through a coded modulation using one or more of Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM), Block coded modulation (BCM), and so on. However, the ECC unit is not limited to any specific structure. The ECC unit may include all circuits, modules, systems, or devices for the error correction.

The PMU may provide and manage power of the controller 130.

Figure 2:
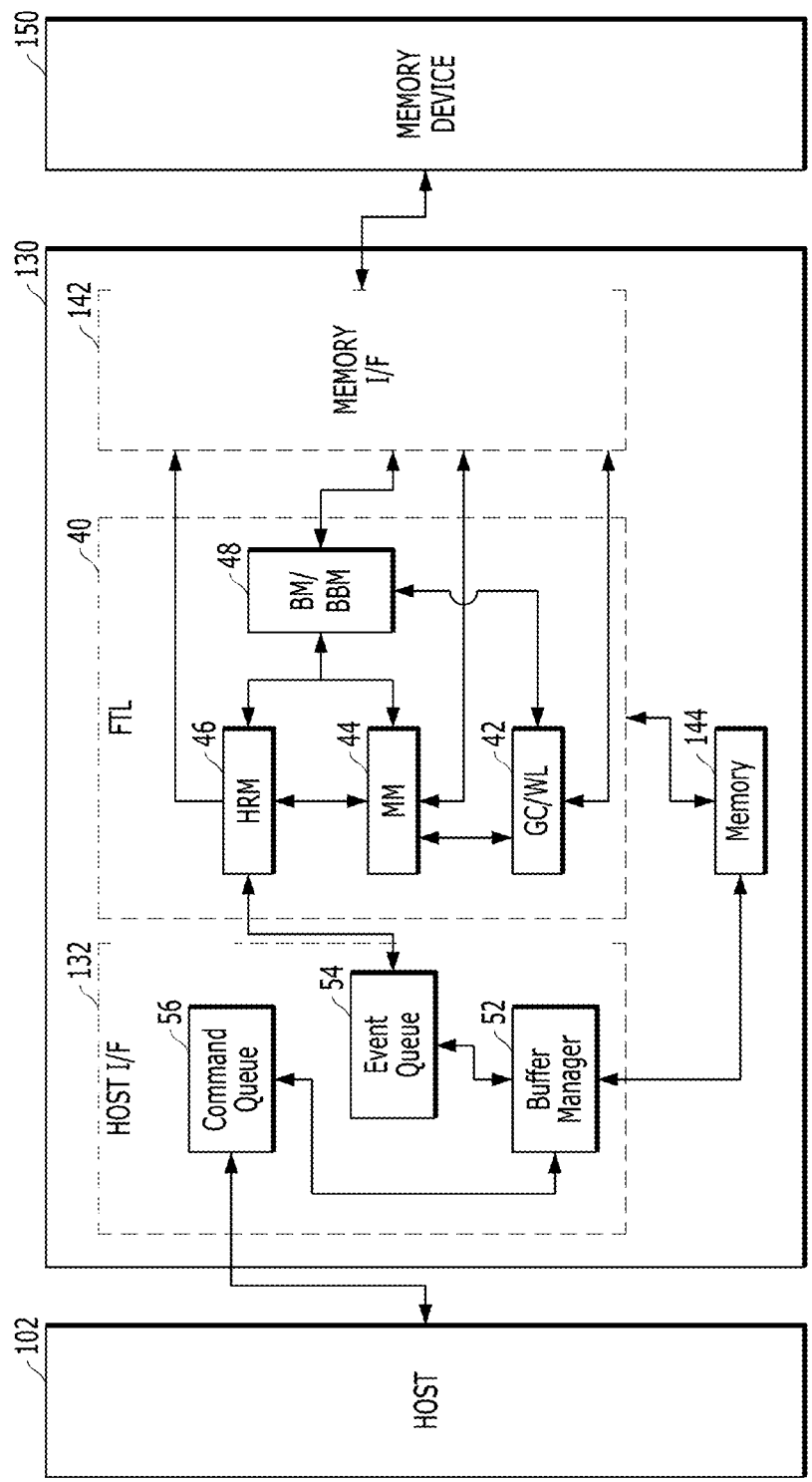
FIG. 2 illustrates a data processing system in accordance with an embodiment of the present disclosure.

FIG. 2 illustrates the data processing system 100 of FIG. 1 in accordance with an embodiment of the present disclosure.

In particular, the controller 130 in the memory system 110 of FIG. 1 is described in more detail in FIG. 2.

Referring to FIG. 2, the controller 130 may include a host interface unit 132, a flash translation layer (FTL) unit 40, a memory interface unit 142, and a memory 144. The FTL unit 40 may be implemented in the processor 134 of FIG. 1.

Although not illustrated in FIG. 2, the ECC unit described FIG. 1 may be included in the flash translation layer (FTL) unit 40 in accordance with an embodiment of the present disclosure. According to another embodiment of the present disclosure, the ECC unit may be realized as a separate module, circuit, or firmware in the controller 130.

The host interface unit 132 may exchange commands and data with the host 102. For example, the host interface unit 132 may include a command queue 56 for sequentially storing the commands, data, and the like that are transferred from the host 102 and then outputting them in the order that they are stored, a buffer manager 52 capable of classifying the commands, data, and the like that are transferred from the command queue 56 or adjusting a processing order of the commands, data, and the like, and an event queue 54 for sequentially delivering events to the FTL unit 40 for processing the commands, data, and the like that are transferred from the buffer manager 52.

The commands and the data transferred from the host 102 may be a plurality of commands and data that have the same characteristics and are successively delivered, or a plurality of commands and data that have different characteristics and are transferred in a mixed order. For example, a plurality of commands for reading data may be delivered, or a read command and a program command may be alternately delivered.

The host interface unit 132 may sequentially store the commands, data, and the like that are transferred from the host 102 in the command queue 56 first, and then the host interface unit 132 may predict what operation the controller 130 is to perform based on the characteristics of the commands, data, and the like that are transferred from the host 102, and may determine a processing order or priority of the commands, data and the like based on the prediction.

Also, depending on the characteristics of the commands, data and the like that are transferred from the host 102, the buffer manager 52 in the host interface unit 132 may determine whether to store the commands, data and the like in the memory 144, or whether to transfer the commands, data and the like to the flash translation layer (FTL) unit 40. The event queue 54 may receive, from the buffer manager 52, an event that needs to be executed and processed internally by the memory system or the controller 130 according to the command, data and the like, and then transfer the event to the FTL unit 40 in the received order.

According to an embodiment of the present disclosure, the FTL unit 40 may include a host request manager (HRM) 46 for managing an event received from the event queue 54, a map manager (MM) 44 for managing map information, a state manager 42 for performing a garbage collection operation or a wear leveling operation, and a block manager 48 for performing a command on a block in the memory device 150.

For example, the host request manager 46 may process read and program commands received from the host interface unit 132 and requests according to events by using the map manager 44 and the block manager 48. The host request manager 46 may send an inquiry request to the map manager 44 to detect a physical address corresponding to a logical address of a request, and process the read command by transferring a flash read command to the memory interface unit 142 for the physical address. Meanwhile, the host request manager 46 may program data in a particular page of an empty block of the memory device 150 by transferring a program request to the block manager 48, and then update mapping information for the logical-physical address mapping by transferring a map update request for the program request to the map manager 44.

Herein, the block manager 48 may convert the program request requested by the host request manager 46, the map manager 44, and the state manager 42 into a program request for the memory device 150 to manage the blocks in the memory device 150. In order to maximize the program or write performance of the memory system 110 of FIG. 1, the block manager 48 may collect program requests and transfer a flash program request for a multi-plane and one-shot program operation to the memory interface unit 142. Also, various outstanding flash program requests may be transferred to the memory interface unit 142 to maximize the parallel processing of a multi-channel and multi-directional flash controller.

Meanwhile, the block manager 48 may manage flash blocks according to the number of valid pages, select and delete a block including no valid pages when a free block is needed, and select a block including a least number of valid pages when a garbage collection operation is required. In order for the block manager 48 to acquire a sufficient number of free blocks, the state manager 42 may perform a garbage collection operation on victim blocks by collecting valid data from the victim blocks, moving the collected valid data into empty blocks, and erasing data stored in the victim blocks.

When the block manager 48 provides the state manager 42 with information about the victim blocks, the state manager 42 may first check all pages of the victim blocks to determine whether each of the pages is valid or not. For example, the validity of each page may be determined, as the state manager 42 identifies a logical address programmed in a spare (which is Out Of Band (OOB)) region of each page, and then compare an actual address of the page with an actual address mapped to a logical address obtained from the inquiry request of the map manager 44. The state manager 42 may transfer a program request to the block manager 48 for each valid page. When a program operation is completed, the map manager 44 may update a mapping table.

The map manager 44 may manage the mapping table and process requests, such as an inquiry request, an update request, and the like, that are generated by the host request manager 46 and the state manager 42. The map manager 44 may store the entire mapping table in a flash memory and cache mapping items according to the capacity of the memory 144. When a map cache miss occurs while processing the inquiry and update requests, the map manager 44 may transfer a read command to the memory interface unit 142 to load the mapping table stored in the memory device 150. When the number of dirty cache blocks of the map manager 44 exceeds a predetermined threshold value, the map manager 44 may transfer a program request to the block manager 48 to create clean cache blocks and store a dirty map table in the memory device 150.

Meanwhile, when the garbage collection operation is performed, the host request manager 46 may program the latest version of data for the same logical address of a page and issue an update request simultaneously while the state manager 42 copies a valid page. When the state manager 42 requests for the map update before the copying of the valid page is not normally completed, the map manager 44 may not update the mapping table. The map manager 44 may perform the map update to ensure accuracy only when the latest map table still represents the previous actual address.

The memory device 150 may include a plurality of memory blocks, which may include a single level cell (SLC) memory block storing one-bit data and/or a multi-level cell (MLC) memory block storing multi-bit data. The SLC memory blocks may include a plurality of pages that are realized by memory cells storing one-bit data in one memory cell. The SLC memory blocks may have a high data processing speed and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated.

The memory device 150 may include not only the MLC memory blocks, each of which includes a plurality of pages that are realized by memory cells capable of storing two-bit data in one memory cell, but also triple-level cell (TLC) memory blocks, each of which includes a plurality of pages that are realized by memory cells capable of storing three-bit data in one memory cell, quad-level cell (QLC) memory blocks, each of which includes a plurality of pages that are realized by memory cells capable of storing four-bit data in one memory cell, and/or multiple level cell memory blocks, each of which includes a plurality of pages that are realized by memory cells capable of storing five or more-bit data in one memory cell.

According to an embodiment of the present disclosure, the controller 130 included in the memory system 110 may check states of a plurality of channels (or ways), particularly, states of channels (or ways) between a plurality of memory dies included in the memory device 150 and the controller 130, or a controller of an arbitrary memory system, e.g., a master memory system, among a plurality of memory systems, may check states of a plurality of channels (or ways) for a plurality of memory systems, particularly, states of channels (or ways) between the master memory system and the other memory systems, i.e., slave memory systems. In other words, it may be checked whether a plurality of channels (or ways) for the memory dies of the memory device 150, or a plurality of channels (or ways) for a plurality of memory systems are in any of a busy state, a ready state, an active state, an idle state, a normal state, an abnormal state, etc. Herein, according to the embodiment of the present disclosure, channels (or ways) having the ready state or the idle state in the normal state may be determined as the best channels (or ways). Particularly, in the embodiment of the present disclosure, among a plurality of channels (or ways), channels (or way) whose available capacity is in a normal range or channels (or way) whose operating level is in a normal range may be determined as the best channels. Herein, an operating level of a channel (or way) may be determined based on an operation clock, a power level, a current/voltage level, an operation timing, a temperature level, and the like of the channel (or way).

Also, according to an embodiment of the present disclosure, it is assumed as an example that write data corresponding to a plurality of write commands received from the host 102 are stored in a buffer/cache included in the memory 144 of the controller 130, and then the data stored in the buffer/cache are programmed and stored in a plurality of memory blocks included in the memory device 150 in program operations. At this time, the map information is updated according to the program operations for programming the data into the memory device 150, and the updated map information is stored in a plurality of memory blocks included in the memory device 150. In short, a case where the program operations are performed in response to the plurality of write commands received from the host 102 is described as an example.

According to an embodiment of the present disclosure, there is provided a case of checking map information of data corresponding to a plurality of read commands from the host 102 for data stored in the memory device 150, reading the data corresponding to the read commands from the memory device 150, storing the read data in the buffer/cache included in the memory 144 of the controller 130, and, when the data stored in the buffer/cache is provided from the host 102, performing read operations corresponding to the read commands received from the host 102.

Also, according to the embodiment of the present disclosure, there is provided a case of receiving a plurality of erase commands for the memory blocks included in the memory device 150 from the host 102, checking memory blocks corresponding to the erase commands, erasing data stored in the checked memory blocks, updating the map information corresponding to the erased data, and then storing the updated map information in the memory blocks included in the memory device 150. In short, a case of performing erase operations corresponding to a plurality of erase commands received from the host 102 is taken and described as an example.

Also, according to an embodiment of the present disclosure, there is provided a case of receiving a plurality of write commands, a plurality of read commands, and a plurality of erase commands from the host 102 as described above, and performing a plurality of program operations, a plurality of read operations, and a plurality of erase operations based on the received commands.

Also, for the sake of convenience in description, a case where the controller 130 may perform command operations in the memory system 110 according to the embodiment of the present disclosure is described as an example. However, as described above, the processor 134 included in the controller 130 may perform the command operations using FTL. For example, according to the embodiment of the present disclosure, the controller 130 may program and store user data and metadata corresponding to the write commands received from the host 102 in arbitrary memory blocks of a plurality of memory blocks included in the memory device 150, read user data and metadata corresponding to the read commands received from the host 102 from arbitrary memory blocks of the plurality of memory blocks included in the memory device 150 and provide the host 102 with the read user data and metadata, or erase user data and metadata corresponding to the erase commands received from the host 102 from arbitrary memory blocks of the plurality of memory blocks included in the memory device 150.

Herein, the metadata may include logical-to-physical (L2P) information and physical-to-logical (P2L) information on data stored in memory blocks in a program operation. The metadata may also include information on command data corresponding to a command received from the host 102, information on a command operation corresponding to a command, information on memory blocks of the memory device 150 on which the command operation is performed, and map information corresponding to the command operation. In other words, the metadata may include all other information and data except for user data corresponding to a command received from the host 102.

When the controller 130 performs a plurality of command operations corresponding to a plurality of commands received from the host 102, for example, when the controller 130 receives a plurality of write commands from the host 102, the controller 130 may perform program operations corresponding to the write commands. In this case, user data corresponding to the write commands may be written and stored in memory blocks of the memory device 150, for example, empty memory blocks in which an erase operation has been performed, open memory blocks, or free memory blocks among the memory blocks of the memory device 150. Mapping information between logical addresses and physical addresses for the user data stored in the memory blocks, i.e., a L2P map table storing logical information, and mapping information between physical addresses and logical addresses for memory blocks storing the user data, i.e., a P2L map table storing physical information, are written and stored in empty memory blocks, open memory blocks, or free memory blocks among the memory blocks of the memory device 150.

Herein, when the controller 130 receives write commands from the host 102, the controller 130 may write and store user data corresponding to the write commands in memory blocks, and store metadata including map information about the user data stored in the memory blocks in the memory blocks. In particular, the controller 130 may generate and update meta segments of the metadata, that is, L2P segments and P2L segments out of the map segments of the map information, and then store them in the memory blocks of the memory device 150. Herein, the map segments stored in the memory blocks of the memory device 150 may be loaded into the memory 144 included in the controller 130 to update the map segments.

When receiving a plurality of write commands from the host 102, states of a plurality of channels (or ways) for the memory device 150 may be checked, particularly, states of channels (or ways) coupled to a plurality of memory dies included in the memory device 150 may be checked, and then the best transfer channels (or transfer ways) and the best receiving channels (or receiving ways) corresponding to the states of the channels (or ways) may be determined independently. According to the embodiment of the present disclosure, user data and metadata corresponding to the write commands may be transferred to corresponding memory dies of the memory device 150 through the best transfer channels (or transfer ways) and stored by performing program operations, and results of the program operations on the corresponding memory dies of the memory device 150 may be received from the corresponding memory dies of the memory device 150 through the best receiving channels (or receive ways), and provided to the host 102.

In addition, when the controller 130 receives a plurality of read commands from the host 102, the controller 130 may read data corresponding to the read commands from the memory device 150, store the read data in the buffer/cache included in the memory 144 of the controller 130, and provide the data stored in the buffer/cache to the host 102.

When the controller 130 receives a plurality of read commands from the host 102, the states of the channels (or ways) for the memory device 150 may be checked, particularly, the states of the channels (or ways) coupled to the memory dies included in the memory device 150 may be checked, and then the best transfer channels (or transfer ways) and the best receiving channels (or receiving ways) corresponding to the states of the channels (or ways) may be independently determined. According to the embodiment of the present disclosure, a read request for user data and metadata corresponding to a read command may be transferred to the corresponding memory dies of the memory device 150 through the best transfer channels (or transfer ways) to perform read operations, and results of the read operations on the corresponding memory dies of the memory device 150, i.e., user data and metadata corresponding to the read command, may be received from the corresponding memory dies of the memory device 150 through the best receiving channels (or receiving ways) and provided to the host 102.

Also, when the controller 130 receives a plurality of erase commands from the host 102, the controller 130 may detect memory blocks of the memory device 150 corresponding to the erase commands, and then perform the erase operations onto the detected memory blocks.

According to the embodiment of the present disclosure, when the plurality of erase commands are received from the host 102, the states of the channels (or ways) for the memory device 150 may be checked, particularly, the states of the channels (or ways) coupled to the memory dies included in the memory device 150 may be checked, and then the best transfer channels (or transfer ways) and the best receiving channels (or receiving ways) corresponding to the states of the channels (or ways) may be determined independently. According to the embodiment of the present disclosure, an erase request for memory blocks in the memory dies of the memory device 150 corresponding to an erase command may be transferred to the corresponding memory dies of the memory device 150 through the best transfer channels (or transfer ways) to perform erase operations, and also results of the erase operations on the corresponding memory dies of the memory device 150 may be received from the corresponding memory dies of the memory device 150 through the best receiving channels (or receiving ways) and provided to the host 102.

In the memory system 110, when a plurality of commands, e.g., a plurality of write commands, a plurality of read commands, and a plurality of erase commands, are received from the host 102, particularly, when the plurality of commands are sequentially and simultaneously received, as described above, the states of the channels (or ways) for the memory device 150 may be checked, and then the best transfer channels (or transfer ways) and the best receiving channels (or receiving ways) corresponding to the states of the channels (or ways) may be determined independently, and the memory device 150 may be requested to perform command operations corresponding to the plurality of commands through the best transfer channels (or transfer ways), particularly, the memory device 150 may be requested to perform the corresponding command operations in a plurality of memory dies included in the memory device 150, and the operation results of the command operations may be received from the memory dies of the memory device 150 through the best receiving channels (or receiving ways). According to the embodiment of the present disclosure, the memory system 110 may provide the host 102 with responses to the commands received from the host 102 by matching the commands transferred through the best transfer channels (or transfer ways) with the operation results received through the best receiving channels (or receiving ways).

The controller 130 may check the states of the plurality of channels (or ways) for the memory device 150, particularly, the channels (or ways) between the plurality of memory dies included in the memory device 150 and the controller 130, and then independently determine the best transfer channels (or transfer ways) and the best receiving channels (or receiving ways) for the memory device 150. The controller 130 may also check states of a plurality of channels (or ways) for a plurality of memory systems, particularly, states of channels (or ways) between a master memory system and the other memory systems, e.g., states of channels (or ways) between a master memory system and slave memory systems, and then independently determine the best transfer channels (or transfer ways) and the best receiving channels (or receiving ways) for the memory systems. In other words, according to the embodiment of the present disclosure, the controller 130 may check the channels (or ways) for the memory dies of the memory device 150 or check whether the states of the channels (or ways) for the memory systems are a busy state, a ready state, an active state, an idle state, a normal state, or an abnormal state. For example, the controller 130 may determine channels (or ways) of a ready state or an idle state in the normal state as the best channels (or ways). Particularly, according to the embodiment of the present disclosure, among the channels (or ways), channels (or ways) whose available capacity is in a normal range and whose operating level is in a normal range may be determined as the best channels. Herein, the operating levels of the channels (or ways) may be determined based on an operation clock, a power level, a current/voltage level, an operation timing, a temperature level, and the like of the channel (or way). Also, according to the embodiment of the present disclosure, a master memory system may be determined among a plurality of memory systems based on information of each memory system, for example, the capability of command operations of each memory system, i.e., the capabilities of the command operations in the controller 130 and the memory device 150 that are included in each memory system. The capabilities may include a performance capability, a process capability, a process speed, and a process latency of the command operations. Herein, the master memory system may be determined through competition between the memory systems. For example, the master memory system may be determined through competition based on a coupling rank between the host 102 and the memory systems.

In order to store or read data requested by the host 102 in the memory device 150, the memory system 110 may map a file system used by the host 102 to a storage space of the memory device 150. For example, an address corresponding to the data according to the file system used by the host 102 may be referred to as a 'logical address' or a 'logical block address,' and an address corresponding to the data in the storage space of the memory device 150 may be referred to as a 'physical address' or a 'physical block address.'

When the host 102 transfers a logical address to the memory system 110 with a read command, the memory system 110 may search for a physical address corresponding to the logical address and then output the data stored in a storage space corresponding to the searched physical address. During this operation, mapping may be performed while the memory system 110 searches for the physical address corresponding to the logical address transferred from the host 102.

When the host 102 knows mapped data (hereinafter, referred to as 'map information') in advance, a time required for the memory system 110 to output the data corresponding to the read command, which is transferred by the host 102, may be reduced.

Figure 3:
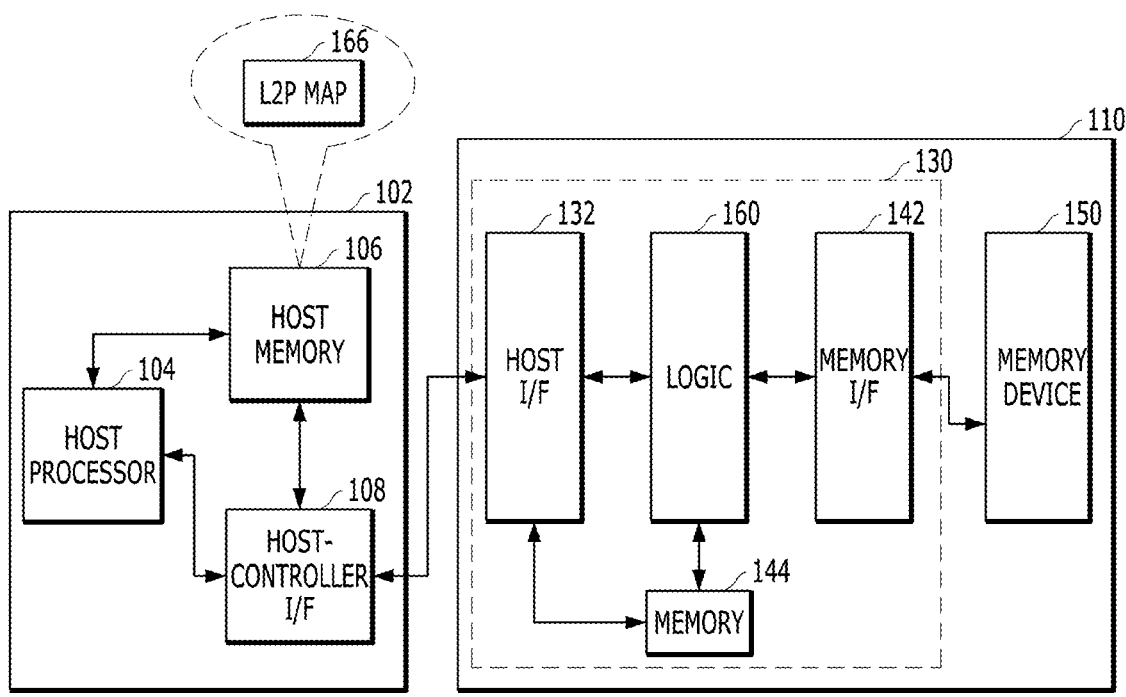
FIGS. 3 and 4 illustrate an example in which a host stores metadata in a host memory in accordance with an embodiment of the present disclosure.
Figure 4:
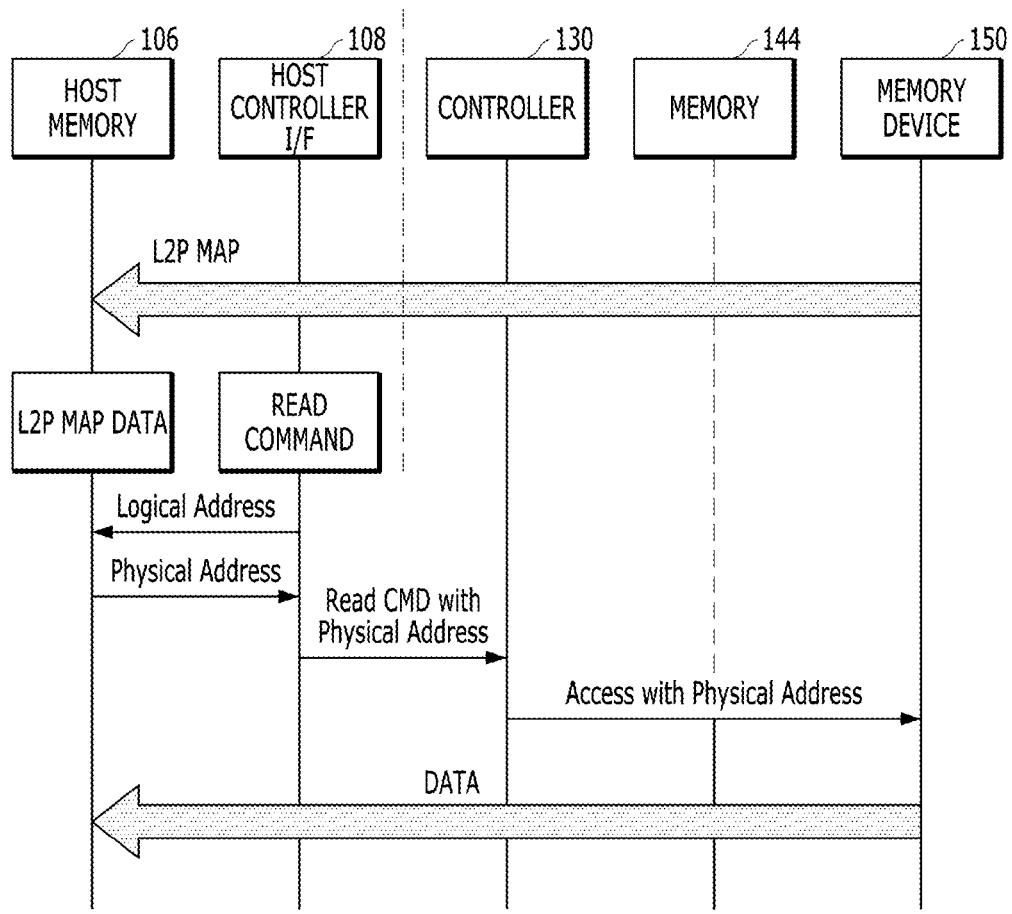

FIGS. 3 and 4 illustrate an example in which a host stores metadata in a host memory in accordance with an embodiment of the present disclosure. Referring to FIGS. 3 and 4, an example in which a host 102 stores metadata in a host memory 106 will be described.

Referring to FIG. 3, the host 102 may include a host processor 104, the host memory 106, and a host-controller interface 108. A memory system 110 may include a controller 130 and a memory device 150. The controller 130 may include a host interface 132, a logic block 160, a memory interface 142, and a memory 144. The controller 130 and the memory device 150 described with reference to FIG. 3 may correspond to the controller 130 and the memory device 150 described with reference to FIGS. 1 and 2.

Hereinafter, descriptions will be provided based on a technical difference between the controller 130 and the memory device 150 illustrated in FIG. 3 and the controller 130 and the memory device 150 described with reference to FIGS. 1 and 2. In particular, the logic block 160 in the controller 130 of FIG. 3 may correspond to the flash translation layer (FTL) unit 40 described above with reference to FIG. 2. However, according to some embodiments, the logic block 160 in the controller 130 may further perform a role and a function that are not performed in the flash translation layer (FTL) unit 40.

In FIG. 3, the host processor 104 may have higher performance and the host memory 106 may have larger capacity than the memory system 110. Unlike the memory system 110, the host processor 104 and the host memory 106 may be advantageous in that they have less space constraints and the hardware of the host processor 104 and the host memory 106 may be upgraded. Therefore, the memory system 110 may utilize resources of the host 102 in order to increase operational efficiency.

As an amount of data that the memory system 110 can store increases, an amount of metadata corresponding to the data stored in the memory system 110 may also increase. Since a space of the memory 144 into which the controller 130 in the memory system 110 may load metadata is limited, the increase in the amount of metadata may be a burden on an operation of the controller 130. For example, the controller 130 may load some but not all of the metadata due to the space constraints in the memory 144. When metadata that is accessed by the host 102 is not included in the partially loaded metadata and some of the loaded metadata is updated, the controller 130 may have to read the metadata accessed by the host 102 from the memory device 150 and store the updated loaded metadata in the memory device 150. These operations may be necessary for the controller 130 to perform a read or write operation required by the host 102, and may degrade the operation performance of the memory system 110.

A storage space of the host memory 106 included in the host 102 may be tens to thousands of times larger than that of the memory 144 that may be used by the controller 130. Accordingly, the memory system 110 may transfer metadata 166 used by the controller 130 to the host memory 106 so that the host memory 106 may be used as a cache memory for an address translation process performed by the memory system 110. In this case, the host 102 may not transfer a logical address with a command to the memory system 110 and may translate the logical address into a physical address based on the metadata 166 stored in the host memory 106 and then transfer the physical address to the memory system 110 along with the command. Accordingly, in this case, the memory system 110 may omit a mapping process for translating the logical address into the physical address and access the memory device 150 based on the physical address transferred from the host 102. As a result, the operational burden occurring when the controller 130 uses the memory 144 may be alleviated, and thus the operational efficiency of the memory system 110 may be significantly increased.

Meanwhile, even though the memory system 110 transfers the metadata 166 to the host 102, the memory system 110 may manage (e.g., update, erase, generate, and the like) sources that become reference for the metadata 166. Since the controller 130 in the memory system 110 may perform background operations, such as a garbage collection operation and a wear leveling operation, according to an operating state of the memory device 150 and determine a physical location (physical address) in the memory device 150, a physical address of data in the memory device 150 may be changed under the control of the controller 130. Therefore, the memory system 110 may take charge of managing the sources that become the reference for the metadata 166.

In other words, when it is determined that the memory system 110 needs to correct or update the metadata 166 transferred to the host 102 in the process of managing the metadata 166, the memory system 110 may request the host 102 to update the metadata 166. The host 102 may update the metadata 166 stored in the host memory 106 in response to the request of the memory system 110. In this way, the metadata 166 stored in the host memory 106 may be kept up to date. Therefore, even though the host controller interface 108 uses the metadata 166 stored in the host memory 106 to perform address mapping, it may not cause a problem in operation.

Meanwhile, the metadata 166 stored in the host memory 106 may include map information for detecting a physical address corresponding to a logical address. Referring to FIG. 2, metadata matching logical addresses and physical addresses to each other may include map information for detecting a physical address corresponding to a logical address and map information for detecting a logical address corresponding to a physical address. The map information for detecting a logical address corresponding to a physical address may be mainly used for an internal operation of the memory system 110, and therefore may not be used when the host 102 stores data in the memory system 110 or reads data corresponding to a specific logical address from the memory system 110.

The controller 130 in the memory system 110 may store map information in the memory device 150 while managing (creating, erasing, updating, etc.) the map information. Since the host memory 106 is a volatile memory, the metadata 166 stored in the host memory 106 may be lost when a power supply interruption occurs in the host 102 and the memory system 110. Accordingly, the controller 130 in the memory system 110 may not only maintain the metadata 166 stored in the host memory 106 up to date but also store the up-to-date map information in the memory device 150.

Referring to FIGS. 3 and 4, when the metadata 166 is stored in the host memory 106, an operation of the host 102 for reading data from the memory system 110 will be described.

Power may be supplied to the host 102 and the memory system 110, and the host 102 and the memory system 110 may interlock. When the host 102 and the memory system 110 interlock, metadata L2P MAP stored in the memory device 150 may be transferred to the host memory 106.

When a read command is generated by the host processor 104, the read command may be transferred to the host controller interface 108. After receiving the read command, the host controller interface 108 may transfer a logical address corresponding to the read command to the host memory 106. Based on the metadata L2P MAP stored in the host memory 106, the host controller interface 108 may detect a physical address corresponding to the logical address.

The host controller interface 108 may transfer a read command Read CMD along with the physical address to the controller 130 in the memory system 110. The controller 130 may access the memory device 150 based on the received read command Read CMD and the physical address. Data stored at a location corresponding to the physical address in the memory device 150 may be transferred to the host 102.

The controller 130 in accordance with the embodiment of the present disclosure may omit a process of receiving the logical address from the host 102 and searching for the physical address corresponding to the logical address. In particular, in a process of the controller 130 for searching for the physical address, an operation of reading metadata by accessing the memory device 150 may be omitted. In this way, the process of the host 102 for reading the data stored in the memory system 110 may become faster.

Figure 5:
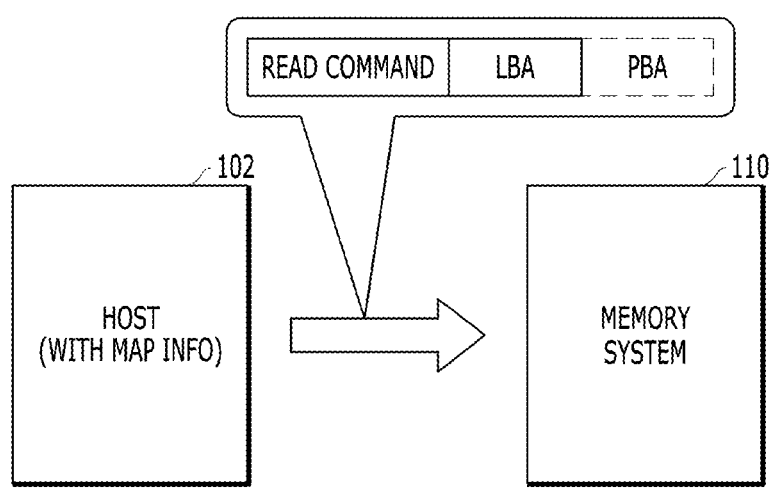
FIG. 5 illustrates a first example of a transaction between a host and a memory system in a data processing system in accordance with an embodiment of the present disclosure.

FIG. 5 illustrates a first example of a transaction between the host 102 and the memory system 110 in a data processing system in accordance with an embodiment of the present disclosure.

Referring to FIG. 5, the host 102 storing map information MAP INFO may transfer a read command including a logical address LBA and a physical address PBA to the memory system 110. When there is information about the physical address PBA corresponding to the logical address LBA in the host memory 106, the host 102 may transfer the read command including the logical address LBA and the physical address PBA to the memory system 110. However, when there is no information about the physical address PBA corresponding to the logical address LBA in the host memory 106, the host 102 may transfer the read command including only the logical address LBA to the memory system 110.

Although FIG. 5 describes the read command as an example, the concept and spirit of the present invention may be applied to a write command or an erase command that the host 102 may transfer to the memory system 110.

Figure 6:
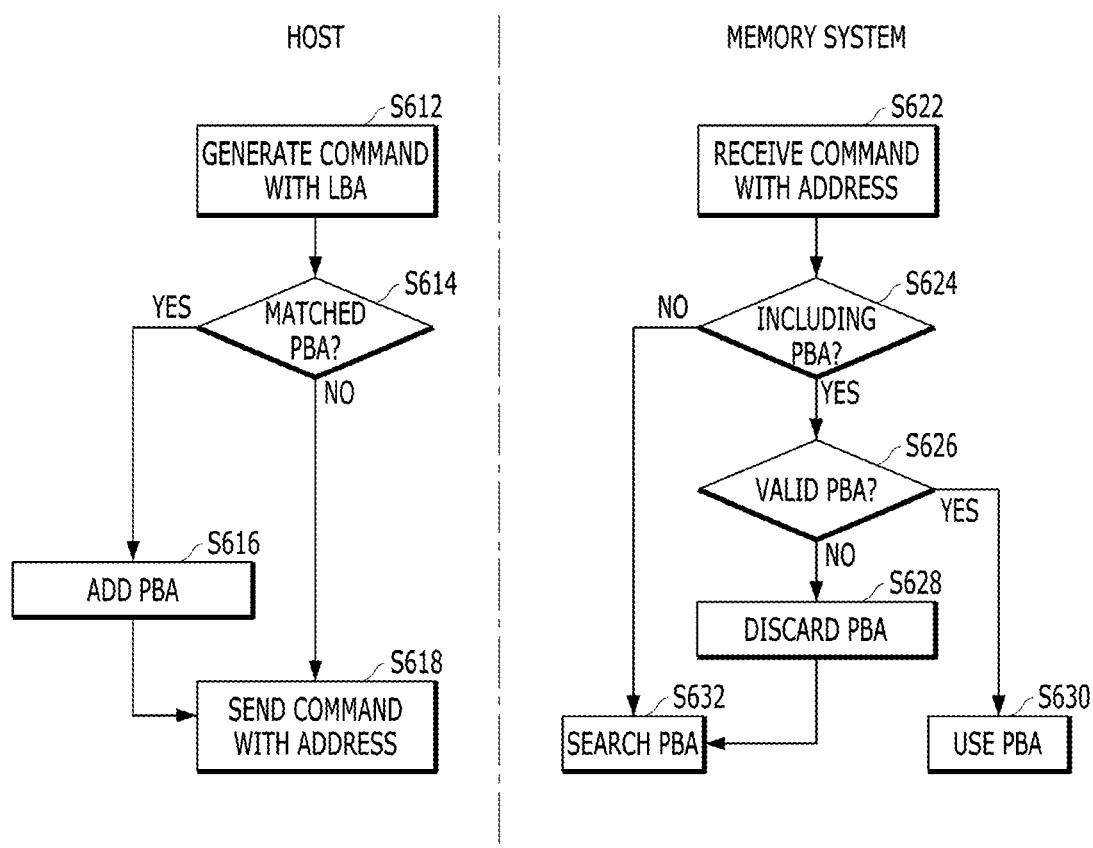
FIG. 6 is a flowchart describing a first operation of a host and a memory system in accordance with an embodiment of the present disclosure.

FIG. 6 is a flowchart describing a first operation of the host 102 and the memory system 110 in accordance with the embodiment of the present disclosure. To be specific, FIG. 6 describes a specific operation between the host 102 and the memory system 110. The host 102 transfers a command COMMAND including a logical address LBA and a physical address PBA, and the memory system 110 receives the command COMMAND.

At S612, the host 102 may generate the command COMMAND including the logical address LBA at a request of a user.

At S614, the host 102 may check whether there is a physical address PBA corresponding to the logical address LBA or not in the map information stored in the host memory 106.

When there is no physical address PBA corresponding to the logical address LBA in the map information ('NO' at S614), at S618, the host 102 may issue the command COMMAND that includes only the logical address LBA to the memory system 110.

Conversely, when there is the physical address PBA corresponding to the logical address LBA in the map information ('YES' at S616), at S616, the host 102 may add the physical address PBA to the command COMMAND including the logical address LBA.

Then, at S618, the host 102 may provide the memory system 110 with the command COMMAND including the logical address LBA and the physical address PBA.

At S622, the memory system 110 may receive the command COMMAND provided from the host 102.

At S624, the memory system 110 may check whether the received command COMMAND includes the physical address PBA or not.

When the received command COMMAND does not include the physical address PBA ('NO' at S624), at S632, the memory system 110 may search for the physical address PBA corresponding to the logical address LBA included in the received command COMMAND in the memory 144 or the memory device 150. The physical address search operation of the memory system 110 may be described in detail with reference to FIG. 7.

Conversely, when the received command COMMAND includes the physical address PBA ('YES' at S624), at S626, the memory system 110 may check whether the physical address PBA is valid or not.

The memory system 110 may transfer the map information to the host 102, and the host 102 may include the physical address PBA in the command COMMAND based on the map information transferred by the memory system 110. However, after the memory system 110 transfers the map information to the host 102, the map information managed by the memory system 110 may be changed and updated. As such, when the map information is dirty, the physical address PBA delivered by the host 102 to the memory system 110 may not be used as it is. Thus, the memory system 110 may be able to determine whether the physical address PBA included in the received command COMMAND is valid or not. For example, the memory system 110 may separately manage dirty map information. To take another example, the memory system 110 may compare the physical address PBA provided from the host 102 with a physical address stored in the memory system 110 to determine the validity of the physical address PBA. However, this is only an example and the concept and spirit of the present invention may not be limited to it.

When the physical address PBA included in the received command COMMAND is valid ('YES' at S626), at S630, the memory system 110 may perform an operation corresponding to the command COMMAND by using the physical address PBA.

Conversely, when the physical address PBA included in the received command COMMAND is not valid ('NO' at S626), at S628, the memory system 110 may discard the physical address PBA included in the received command COMMAND.

At S632, the memory system 110 may search for a physical address corresponding to the logical address LBA included in the received command COMMAND.

Figure 7:
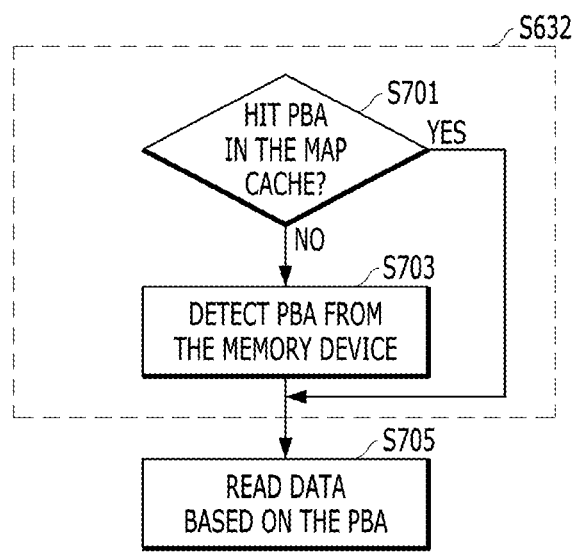
FIG. 7 is a flowchart describing an operation of a memory system in accordance with an embodiment of the present disclosure.

FIG. 7 is a flowchart describing an operation of a memory system in accordance with an embodiment of the present disclosure. In particular, FIG. 7 specifically illustrates the operation S632 shown in FIG. 6.

Referring back to FIG. 6, when the command COMMAND provided from the host 102 does not include the physical address PBA, or when the physical address PBA is invalid even though the command COMMAND includes the physical address PBA, the memory system 110 may search for a physical address corresponding to the logical address LBA included in the command COMMAND at S632.

First, at S701, the memory system 110 may determine whether a physical address is hit in the map cache 146 of the memory 144 shown in FIG. 1. In other words, the memory system 110 may check whether information on the physical address is stored in the map cache 146 or not.

When the physical address is not hit in the map cache 146 ('NO' at S701), at S703, the memory system 110 may detect a physical address in the memory device 150. To be specific, the memory system 110 may search the memory device 150 for the physical address corresponding to the logical address LBA included in the command COMMAND provided from the host 102. After that, the memory system 110 may store the searched physical address in the map cache 146.

Then, when the command COMMAND is a read command, at S705, the memory system 110 may read data based on the physical address searched from the memory device 150.

On the other hand, when the physical address is hit in the map cache 146 ('YES' at S701), at S705, the memory system 110 may read the data based on the physical address stored in the map cache 146.

When the physical address is stored in the map cache 146, the memory system 110 may skip the operation of searching the memory device 150 for the physical address. As a result, the memory system 110 may be able to efficiently perform the read operation according to the read command. When the map cache 146 stores lots of map information, the memory system 110 may efficiently perform a read operation. However, the map cache 146 may have a limited storage capacity. Thus, the memory system 110 may have to selectively store map information in the map cache 146 in order to efficiently perform the read operation. For example, the memory system 110 may store frequently used map information in the map cache 146.

The memory system 110 in accordance with the embodiment of the present disclosure may include the map cache 146 having a structure capable of selectively storing map information.

Figure 8A:
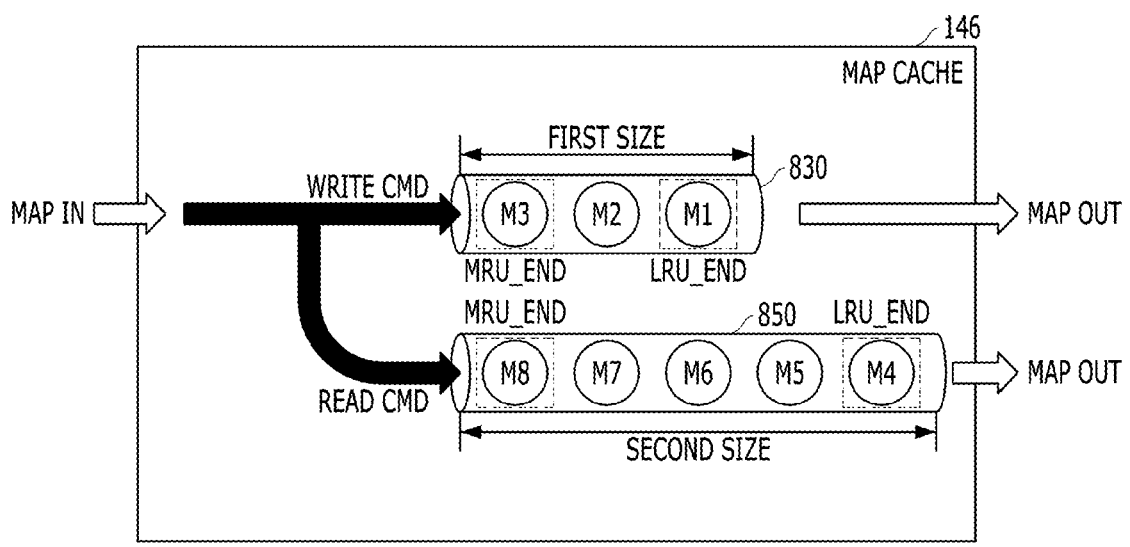
FIG. 8A illustrates a structure of a map cache in accordance with the embodiment of the present disclosure.

FIG. 8A illustrates a structure of the map cache 146 shown in FIG. 1 in accordance with an embodiment of the present disclosure.

The map cache 146 may include a write map cache 830 and a read map cache 850. The map cache 146 may store map information in the write map cache 830 and the read map cache 850. FIG. 8A illustrates the write map cache 830 and the read map cache 850 that are full of map information. The map cache 146 may selectively store the map information in the two map caches 830 and 850 according to the order in which the map information is inputted thereto.

The write map cache 830 and the read map cache 850 may have different sizes. The size of each of the write map cache 830 and the read map cache 850 may refer to a space where the map information is stored. The larger the map cache is, the more map information may be stored. FIG. 8A exemplarily illustrates the write map cache 830 having a first size and the read map cache 850 having a second size.

Map information of different properties may be stored in the write map cache 830 and the read map cache 850, respectively. For example, the write map cache 830 may store map information corresponding to a write command, whereas the read map cache 850 stores map information corresponding to a read command.

The write map cache 830 and the read map cache 850 may store the map information according to an LRU (Least Recently Used) scheme. FIG. 8A shows an example that the write map cache 830 and the read map cache 850 are realized based on the LRU scheme. Ends MRU_END of MRUs (Most Recently Used) of the write map cache 830 and the read map cache 850 may indicate locations of map information that is most recently accessed. Ends LRU_END of LRUs shown in the write map cache 830 and the read map cache 850 may indicate locations of map information that is accessed the longest ago.

When new map information that is not cached in the map cache 146 is accessed according to a write command or a read command and thus is newly stored in a first cache, which is either the write map cache 830 or the read map cache 850, the new map information may be stored at the end MRU_END of the MRU of the first cache. When the space of the first cache is not enough to store the new map information, map information located at the end LRU_END of the LRU of the first cache may be outputted to the outside.

When certain map information stored in the first cache is accessed again according to a homogeneous command, the certain map information may be moved to the end MRU_END of the MRU of the first cache.

When the certain map information stored in the first cache is accessed again according to a heterogeneous command, the certain map information may be moved to the end MRU_END of the MRU of a second cache corresponding to the heterogeneous command. When the space of the second cache is not enough to store the certain map information, map information located at the end LRU_END of the LRU of the second cache may be outputted to the outside. As the certain map information stored in the first cache is moved to the end MRU_END of the MRU of the second cache, an amount of map information cached in the first cache may decrease.

Referring to FIG. 8A, first to third map information M1 to M3 may be stored in the write map cache 830 in the order that they are accessed. When new map information corresponding to a write command is inputted to the map cache 146 (MAP IN), the first map information M1 stored at the end LRU_END of the LRU of the write map cache 830 may be outputted to the outside of the map cache 146 (MAP OUT). The new map information may then be stored in the write map cache 830.

The read map cache 850 may store the fourth to eighth map information M4 to M8 in the order that they are accessed. On the same principle, when new map information corresponding to a read command is inputted to the map cache 146 (MAP IN), the fourth map information M4 stored at the end LRU_END of the LRU of the read map cache 850 may be outputted to the outside of the map cache 146 (MAP OUT). The new map information may then be stored in the read map cache 850.

Meanwhile, the map information which was located at the end LRU_END of the LRU of the write map cache 830 or the read map cache 850 and then outputted may not be accessed often compared with the map information remaining in the map cache 146. However, the outputted map information was stored in the map cache 146 recently, and thus the outputted map information may be accessed more frequently than map information that has not been stored in the map cache 146 recently.

The host 102 may access the memory device 150 at the fastest speed when the map information is stored in the map cache 146. When the map information is stored in the host memory 106 of the host 102, the host 102 may access the memory device 150 at the second fastest speed. When the map information is stored in the memory device 150, the host 102 may access the memory device 150 at the slowest speed.

The outputted map information may be map information outputted from the write map cache 830 and map information outputted from the read map cache 850.

The map information outputted from the write map cache 830 is more likely to be accessed again for a write operation than the map information that has not been stored in the map cache 146 recently. However, whenever a write operation is performed, the map information may be changed. Therefore, when the memory system 110 transfers the map information outputted from the write map cache 830 to the host 102, whenever the map information is updated in the memory system 110 by a write operation, the host 102 may have to update the map information. As a result, the host 102 may have much burden. Thus, the memory system 110 may not provide the host 102 with the map information that is outputted from the write map cache 830.

On the other hand, the map information outputted from the read map cache 850 is more likely to be accessed again for a read operation than the map information that has not been stored in the map cache 146 recently. Whenever a read operation is performed, the map information may not be changed. Therefore, even when the memory system 110 transfers the map information outputted from the read map cache 850 to the host 102, there is a high probability that the host 102 does not update the map information. Therefore, the memory system 110 may provide the host 102 with the map information outputted from the read map cache 850. The host 102 may perform a read operation more quickly by providing a read command and a physical address based on the map information.

FIG. 8B is a flowchart describing an operation of processing map information by using a map cache in accordance with an embodiment of the present disclosure. FIG. 8B shows only a process of storing the map information in the map cache.

At S801, the memory system 110 may receive a read command or a write command from the host 102. The host 102 may selectively provide the memory system 110 with map information corresponding to the read command or the write command along with the read command or the write command.

At S803, the memory system 110 may input the map information corresponding to the read command or the write command. To be specific, the map cache 146 of the memory 144 may receive the map information under the control of the processor 134. Hereinafter, for the sake of convenience in explanation, the inputted map information may be referred to as 'target map information.'

At S805, it is determined whether the host 102 provides the memory system 110 with the read command or the write command. When the host 102 provides the memory system 110 with the read command ('NO' at S805), at S807, the memory system 110 may check whether there is an empty space in the read map cache 850 for storing the target map information.

When there is no empty space in the read map cache 850 ('NO' at S807), at S809, the map cache 146 may output old map information that is the oldest information among map information stored in the read map cache 850 to the outside. The oldest map information may be provided to the host 102, and the processing of the outputted old map information will be described later in detail with reference to FIG. 15 to FIG. 18.

Then, at S811, the map cache 146 may store the target map information in the read map cache 850. The map cache 146 may store the target map information in the read map cache 850 according to the LRU scheme.

On the other hand, when there is the empty space in the read map cache 850 ('YES' at S807), at S811, the map cache 146 may store the target map information in the read map cache 850 without outputting the old map information. The map cache 146 may store the target map information in the read map cache 850 according to the LRU scheme.

When the host 102 provides the memory system 110 with the write command ('YES' at S805), at S813, the memory system 110 may check whether there is an empty space in the write map cache 830 for storing the target map information.

When there is no empty space in the write map cache 830 ('NO' at S813), at S815, the map cache 146 may output old map information that is the oldest information among map information stored in the write map cache 830 to the outside. The outputted oldest map information may be deleted.

Then, at S817, the map cache 146 may store the target map information in the write map cache 830. The map cache 146 may store the target map information in the write map cache 830 according to the LRU scheme.

On the other hand, when there is the empty space in the write map cache 830 ('YES' at S813), at S817, the map cache 146 may store the target map information in the write map cache 830 without outputting the old map information. The map cache 146 may store the target map information in the write map cache 830 according to the LRU scheme.

Hereinafter, the process of inputting and outputting map information will be described with reference to FIGS. 9 to 14B by utilizing the structure of the map cache 146 illustrated in FIG. 8A. As illustrated in FIG. 8A, it is assumed that the first to third map information M1 to M3 corresponding to the write command are stored in the write map cache 830 and that the fourth to eighth map information M4 to M8 corresponding to the read command are stored in the read map cache 850. It is also assumed that the map cache 146 stores map information that is recently accessed. However, this is not more than a mere example and the concept and spirit of the present invention are not limited thereto.

Figure 9:
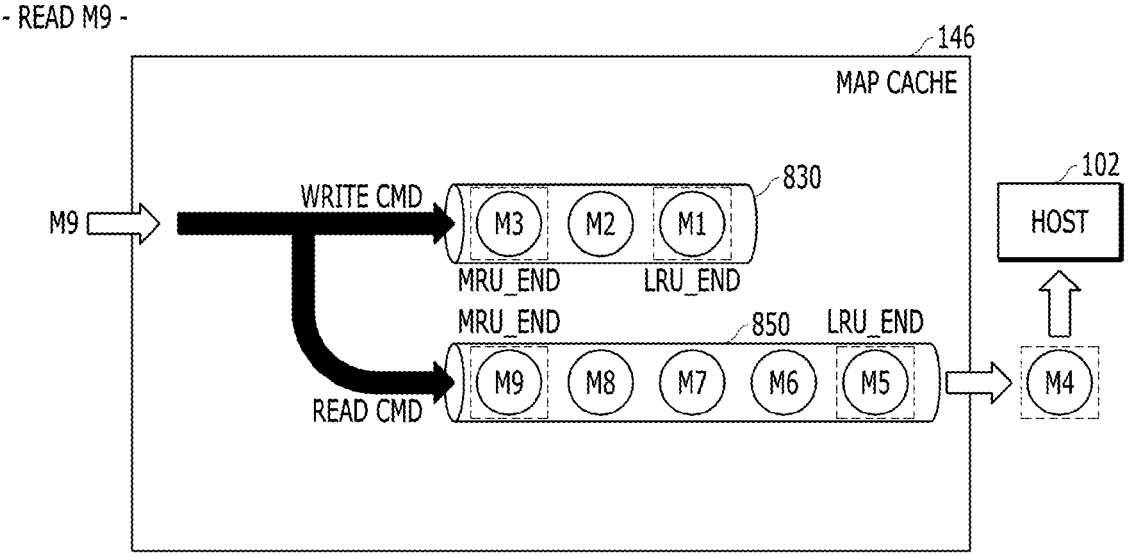
FIGS. 9 to 14B illustrate a map information processing operation in accordance with the embodiment of the present disclosure.

FIG. 9 illustrates a map information processing operation in accordance with an embodiment of the present disclosure. FIG. 9 shows an operation of the memory system 110 for storing new map information, e.g., ninth map information M9 corresponding to the read command, in the map cache 146.

Referring to FIG. 9, the ninth map information M9 may be inputted to the map cache 146. The map cache 146 may have to store the ninth map information M9 in the read map cache 850. However, the read map cache 850 may be full of the fourth to eighth map information M4 to M8. Thus, the map cache 146 may output the fourth map information M4 that is the oldest information stored in the read map cache 850 to the outside of the map cache 146. The map cache 146 may store the ninth map information M9 in the read map cache 850. The ninth map information M9 may be stored at the end MRU_END of the MRU as the most recently accessed map information according to the LRU scheme. When the fourth map information M4 is outputted, the fifth to eighth map information M5 to M8 may be shifted toward the end LRU_END of the LRU, and thus the fifth map information M5 that becomes the oldest information among the fifth to ninth map information M5 to M9 may be stored at the end LRU_END of the LRU.

The memory system 110 may provide the host 102 with the fourth map information M4 outputted from the map cache 146. Then, the host 102 may store the fourth map information M4 in the host memory 106. Alternatively, when the fourth map information M4 is already stored in the host memory 106, the host 102 may update the map information stored in the host memory 106 based on the fourth map information M4 received from the memory system 110. A detailed description thereof will be provided with reference to FIGS. 15 to 18.

Figure 10:
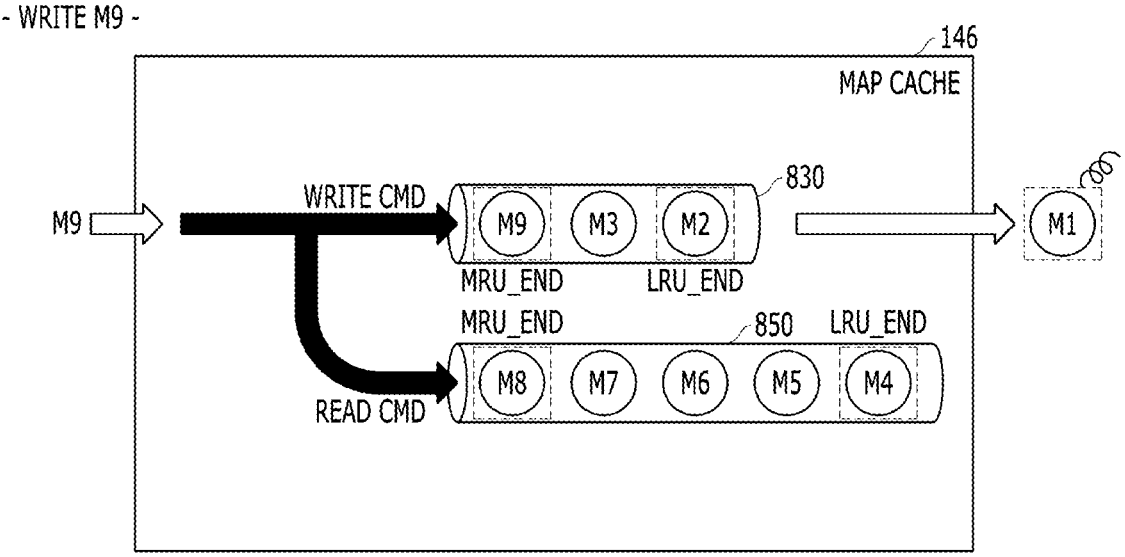

FIG. 10 illustrates a map information processing operation in accordance with an embodiment of the present disclosure. FIG. 10 shows an operation of the memory system 110 for storing new map information, e.g., the ninth map information M9 corresponding to the write command, in the map cache 146.

Referring to FIG. 10, the ninth map information M9 may be inputted to the map cache 146. The map cache 146 may have to store the ninth map information M9 in the write map cache 830. However, the write map cache 830 may be full of the first to third map information M1 to M3. Thus, the map cache 146 may output the first map information M1 that is the oldest information stored in the write map cache 830 to the outside of the map cache 146. After that, the second and third map information M2 and M3 may be shifted toward the end LRU_END of the LRU, and then the map cache 146 may store the ninth map information M9 in the write map cache 830.

The memory system 110 may delete the first map information M1 outputted from the map cache 146.

Figure 11A:
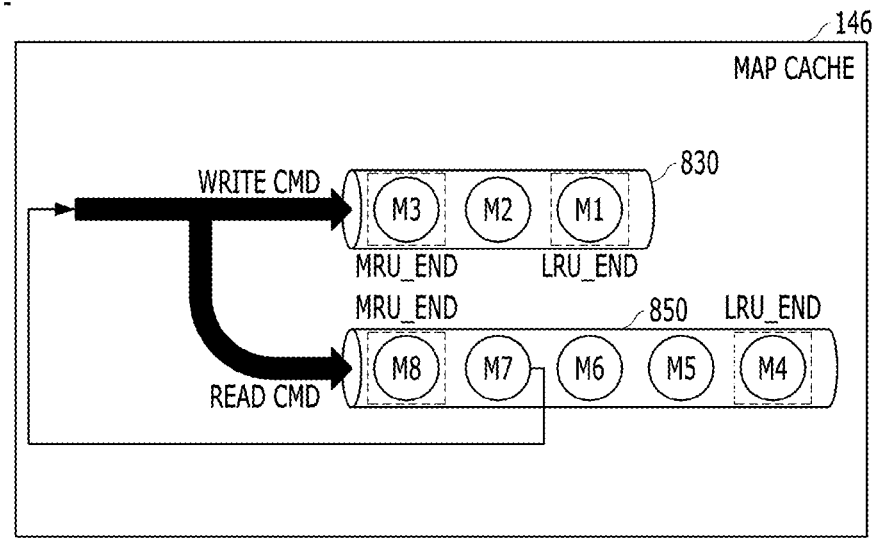
Figure 11B:
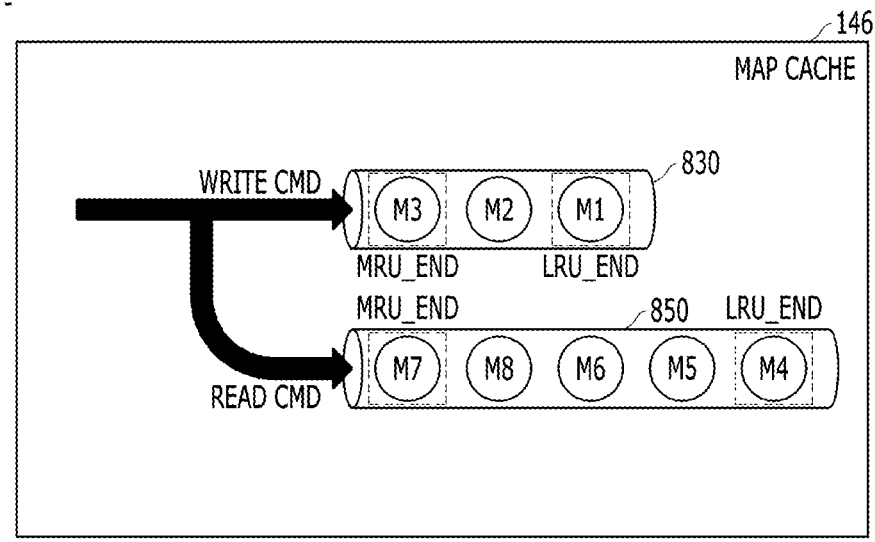

FIGS. 11A and 11B illustrate a map information processing process in accordance with an embodiment of the present disclosure. FIGS. 11A and 11B illustrate a moving path of the seventh map information M7 when the memory system 110 accesses the seventh map information M7 stored in the read map cache 850 in response to a read command.

The seventh map information M7 may be stored in the read map cache 850 as the most recently accessed map information according to the LRU scheme. Referring to FIG. 11B, the map cache 146 may move the seventh map information M7 stored in the read map cache 850 to the end MRU_END of the MRU.

FIG. 11B illustrates a state in which the seventh map information M7 is moved to the end MRU_END of the MRU. The eighth map information M8 previously stored at the end MRU_END of the MRU may be the second most recently accessed map data. Therefore, a storage location of the eighth map information M8 may be changed. As a result, a storage location of the seventh map information M7 may be changed to the previous storage location of the eighth map information M8 in the read map cache 850.

Figure 12A:
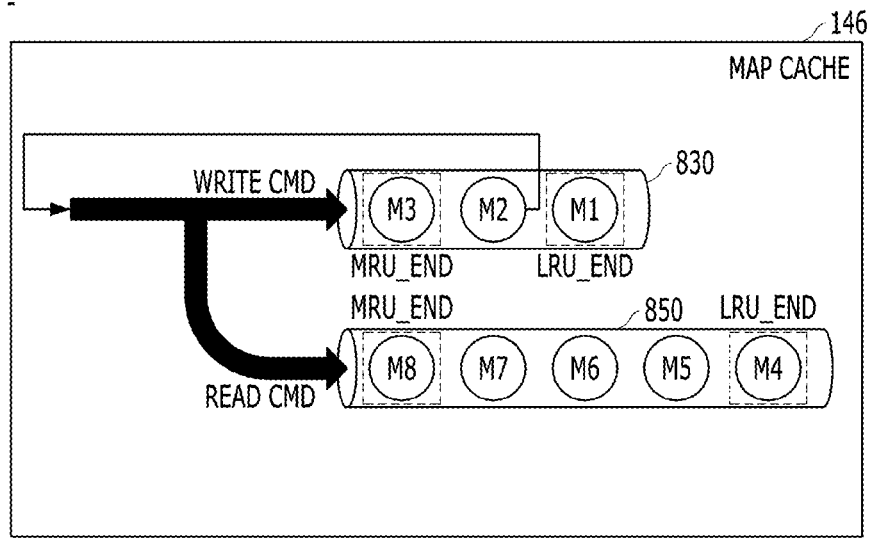
Figure 12B:
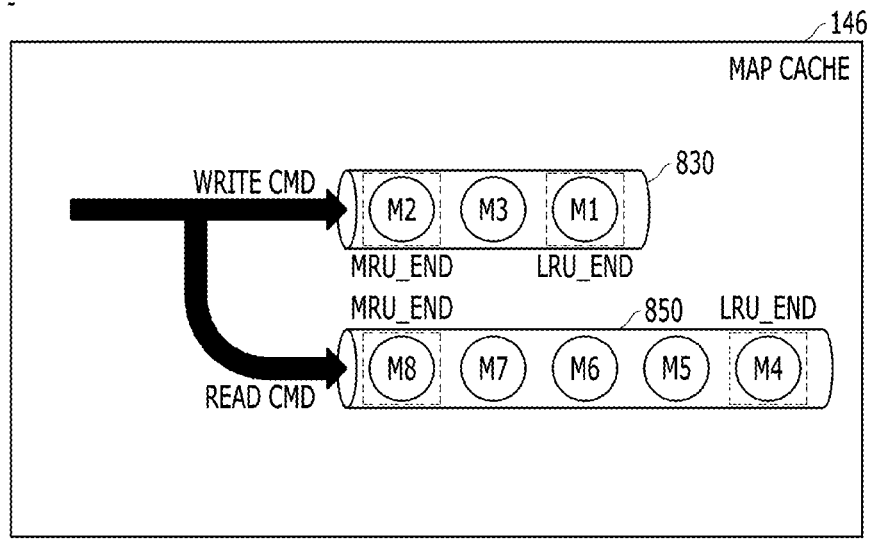

FIGS. 12A and 12B illustrate a map information processing process in accordance with an embodiment of the present disclosure. FIGS. 12A and 12B illustrate a moving path of the second map information M2 when the memory system 110 accesses the second map information M2 stored in the write map cache 830 in response to a write command.

The second map information M2 may be stored in the write map cache 830 as the most recently accessed map information according to the LRU scheme. Referring to FIG. 12B, the map cache 146 may move the second map information M2 stored in the write map cache 830 to the end MRU_END of the MRU. FIG. 12B illustrates a state in which the second map information M2 is moved to the end MRU_END of the MRU. The third map information M3 which is previously stored at the end MRU_END of the MRU may be the second most recently accessed map data. Therefore, a storage location of the third map information M3 may be changed. As a result, a storage location of the second map information M2 may be changed to the previous storage location of the third map information M3 in the write map cache 830.

Figure 13A:
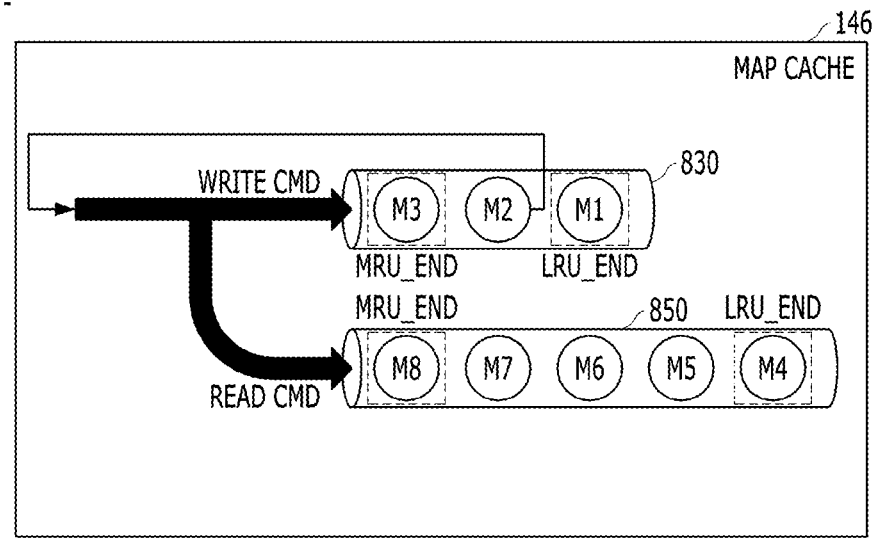
Figure 13B:
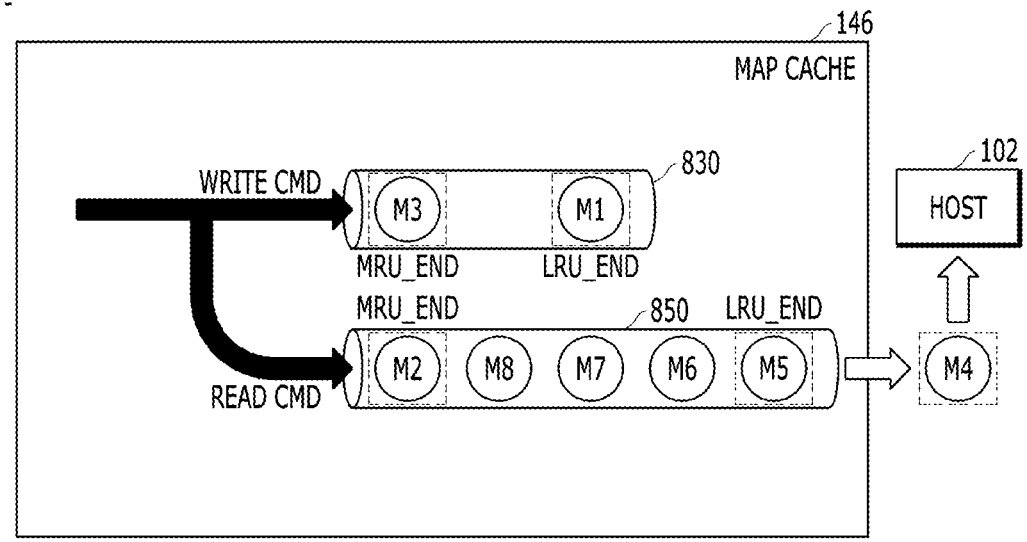

FIGS. 13A and 13B illustrate a map information processing process in accordance with an embodiment of the present disclosure. FIGS. 13A and 13B illustrate a moving path of the second map information M2 when the memory system 110 accesses the second map information M2 stored in the write map cache 830 in response to a read command.

The second map information M2 may be stored in the read map cache 850 as the most recently accessed map information according to the LRU scheme. Referring to FIG. 13B, the map cache 146 may move the second map information M2 stored in the write map cache 830 to the end MRU_END of the MRU of the read map cache 850. Referring to FIG. 13B, the map cache 146 may remove the second map information M2 stored in the write map cache 830, and store the second map information M2 at the end MRU_END of the MRU of the read map cache 850.

FIG. 13B illustrates a state in which the second map information M2 is moved to the end MRU_END of the MRU of the read map cache 850. In FIG. 13B, the read map cache 850 of the second size may be full of map information. Therefore, the map cache 146 may output the fourth map information M4 stored at the end LRU_END of the LRU in the read map cache 850 to the outside of the map cache 146. After that, the map cache 146 may store the second map information M2 at the end MRU_END of the MRU of the read map cache 850. Furthermore, an empty space may be generated in the write map cache 830 by removing the second map information M2 from the write map cache 830.

The memory system 110 may provide the host 102 with the fourth map information M4 outputted from the map cache 146. Then, the host 102 may store the fourth map information M4 in the host memory 106. Alternatively, when the fourth map information M4 is already stored in the host memory 106, the host 102 may update map information stored in the host memory 106 based on the fourth map information M4 received from the memory system 110. A detailed description thereof will be provided later with reference to FIGS. 15 to 18.

Figure 14A:
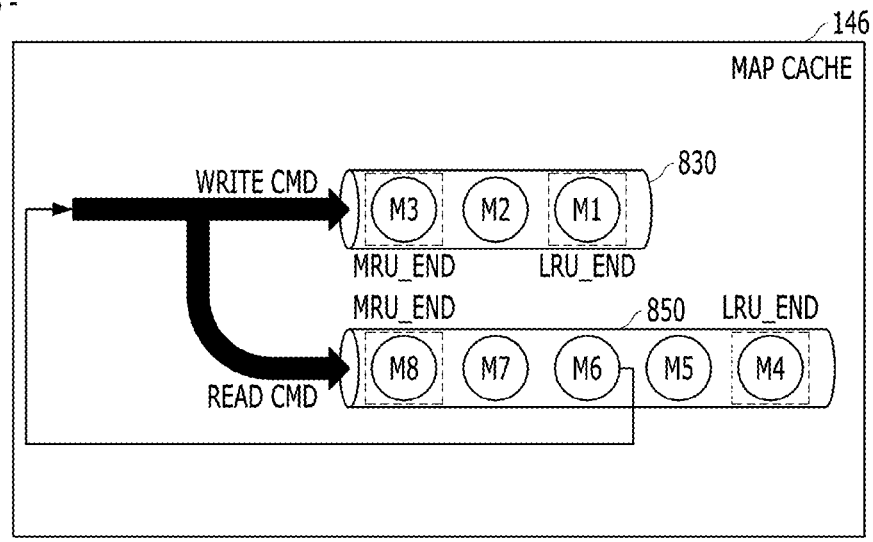
Figure 14B:
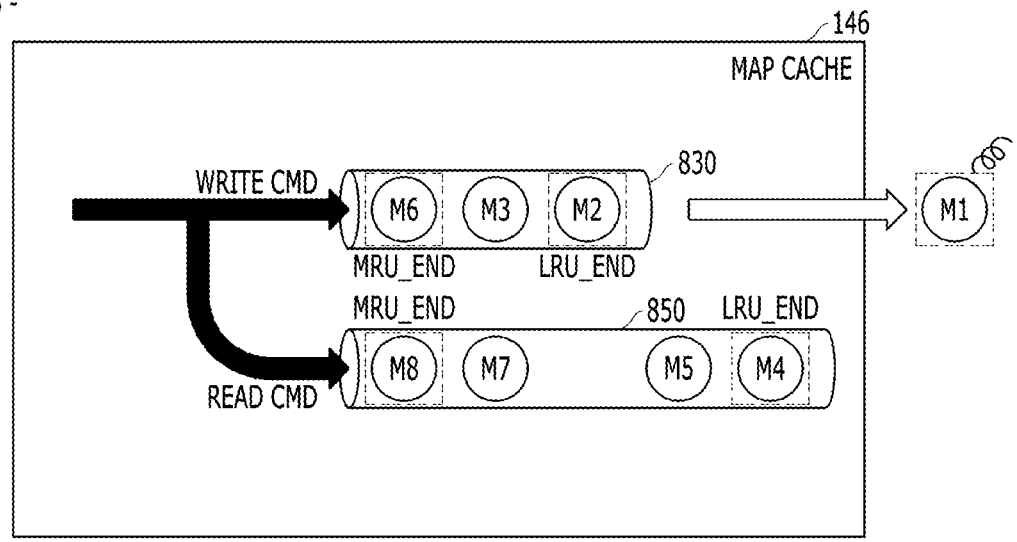

FIGS. 14A and 14B illustrate a map information processing process in accordance with an embodiment of the present disclosure. FIGS. 14A and 14B illustrate a moving path of the sixth map information M6 when the memory system 110 accesses the sixth map information M6 stored in the read map cache 850 in response to a write command.

The sixth map information M6 may be stored in the write map cache 830 as the most recently accessed map information according to the LRU scheme. Referring to FIG. 14B, the map cache 146 may move the sixth map information M6 stored in the read map cache 850 to the end MRU_END of the MRU of the write map cache 830. Referring to FIG. 14B, the map cache 146 may remove the sixth map information M6 stored in the read map cache 850, and store the sixth map information M6 at the end MRU_END of the MRU of the write map cache 830.

FIG. 14B illustrates a state in which the sixth map information M6 is moved to the end MRU_END of the MRU of the write map cache 830. In FIG. 14B, the write map information cache 830 of the first size may be full of map information. Accordingly, the map cache 146 may output the first map information M1 stored at the end LRU_END of the LRU of the write map cache 830 to the outside of the map cache 146. The map cache 146 may store the sixth map information M6 at the end MRU_END of the MRU of the write map cache 830. Furthermore, an empty space may be generated in the read map cache 850 by removing the sixth map information M6 from the read map cache 850.

The memory system 110 may delete the first map information M1 outputted from the map cache 146.

FIGS. 9 to 14B illustrate the map cache 146 that stores recently accessed map information. However, embodiments are not limited thereto. In another embodiment, the map cache 146 may store the most frequently accessed map information according to a Least Frequency Used (LFU) scheme.

Figure 15:
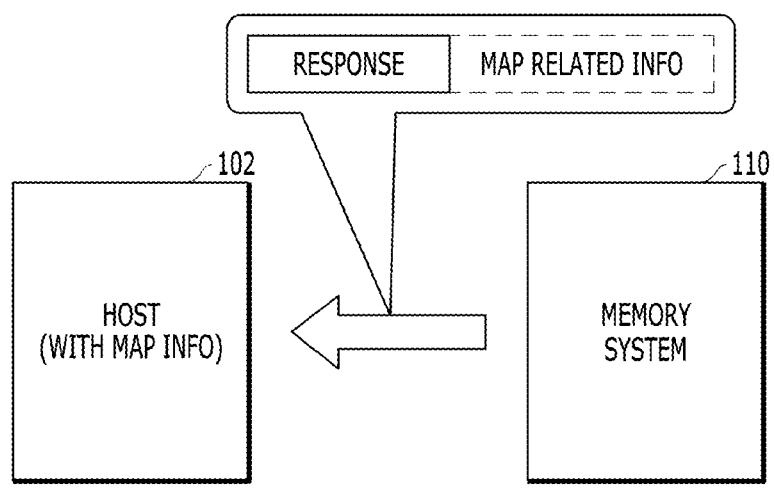
FIG. 15 illustrates a second example of a transaction between a host and a memory system in a data processing system in accordance with an embodiment of the present disclosure.

FIG. 15 illustrates a second example of a transaction between the host 102 and the memory system 110 in a data processing system in accordance with an embodiment of the present disclosure.

Referring to FIG. 15, the memory system 110 may transfer map information MAP INFO to the host 102. The memory system 110 may transfer the map information MAP INFO based on a response RESPONSE to a command COMMAND of the host 102. In particular, as described above with reference to FIGS. 9 to 13B, the memory system 110 may provide the host 102 with map information outputted from the read map cache 850.

There may be no particular restrictions on a response for transferring map information. For example, the memory system 110 may transfer the map information to the host 102 by using a response corresponding to a read command, a response corresponding to a write command, or a response corresponding to an erase command.

The memory system 110 and the host 102 may exchange a command and a response based on a unit format which is set according to a predetermined protocol. For example, the format of the response may include a basic header, a command due to the success or failure of the command transferred by the host 102, and additional information representing a state of the memory system 110. The memory system 110 may include the map information in the response and transfer the response including the map information to the host 102.

Figure 16:
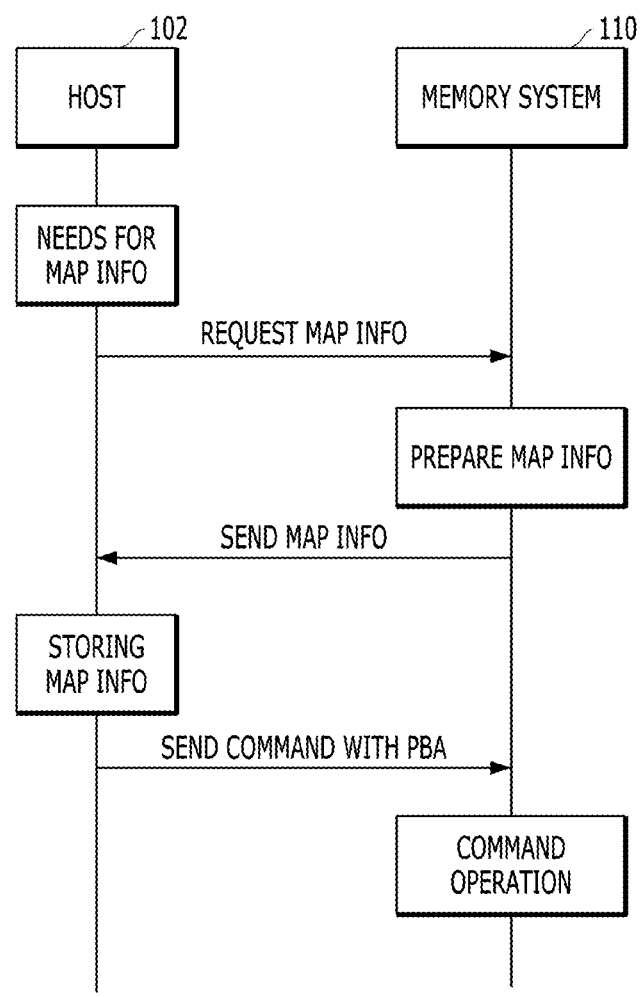
FIG. 16 illustrates a second operation of a host and a memory system in accordance with an embodiment of the present disclosure.

FIG. 16 illustrates a second operation of the host 102 and the memory system 110 in accordance with an embodiment of the present disclosure. To be specific, FIG. 16 illustrates a process in which the host 102 requests the memory system 110 for map information and the memory system 110 transfers the map information in response to the request from the host 102.

Referring to FIG. 16, needs for the map information may occur in the host 102. For example, when the host 102 may allocate a space to store the map information, or when data is expected to be inputted or outputted quickly to or from the memory system 110 in response to a command, the needs for the map information may occur. Also, needs for the map information may occur in the host 102 at a request of a user.

The host 102 may request the memory system 110 for the map information, and the memory system 110 may prepare the map information in response to the request from the host 102. According to the embodiment of the present disclosure, the host 102 may specifically request for the map information required by the memory system 110. Meanwhile, according to another embodiment of the present disclosure, the host 102 may request the memory system 110 for the map information, but which map information is to be provided may be determined by the memory system 110.

The memory system 110 may transfer the prepared map information to the host 102. The host 102 may store the map information transferred from the memory system 110 in an internal storage space (e.g., the host memory 106 described in FIG. 3).

The host 102 may include a physical address PBA in a command by using the stored map information, and transfer the command including the physical address PBA to the memory system 110. The memory system 110 may perform a corresponding operation based on the physical address PBA included in the command.

Figure 17:
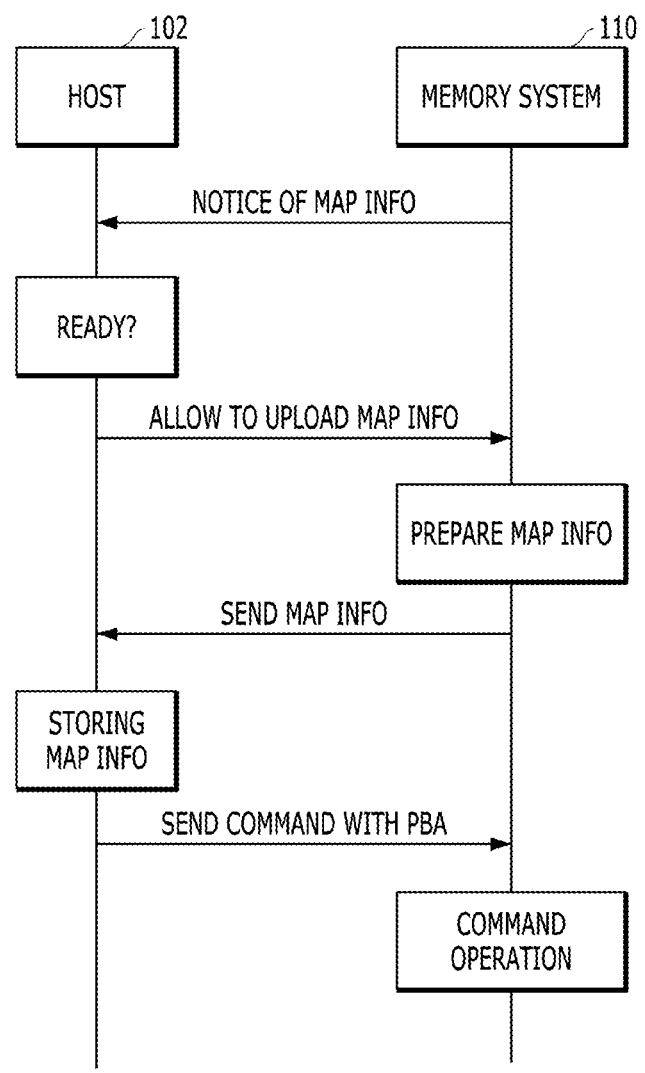
FIG. 17 illustrates a third operation of a host and a memory system in accordance with an embodiment of the present disclosure.

FIG. 17 illustrates a third operation of the host 102 and the memory system 110 in accordance with an embodiment of the present disclosure. To be specific, FIG. 17 illustrates a process in which the memory system 110 requests the host 102 to transfer map information and the host 102 receives the map information in response to the request of the memory system 110.

Referring to FIG. 17, the memory system 110 may notify the host 102 of transferring the map information. The host 102 may determine whether the map information can be stored in the host 102 in response to the notice regarding the map information transferred from the memory system 110. When the host 102 can receive the map information transferred from the memory system 110, the host 102 may allow the memory system 110 to upload the map information to the host 102. The memory system 110 may prepare the map information and then transfer the map information to the host 102.

Subsequently, the host 102 may store the received map information in the internal storage space (e.g., the host memory 106 described in FIG. 3). The host 102 may perform a mapping operation based on the stored map information and include a physical address PBA in a command to be transferred to the memory system 110.

The memory system 110 may check whether the command transferred from the host 102 includes the physical address PBA or not, and perform an operation corresponding to the command based on the physical address PBA when the command transferred from the host 102 includes the physical address PBA.

Regarding the transfer of the map information, the operation of FIG. 16 may be different from the operation of FIG. 17 in that the second operation of the host 102 and the memory system 110 described above with reference to FIG. 16 is initially performed by the host 102, whereas the third operation of the host 102 and the memory system 110 described above with reference to FIG. 17 is initially performed by the memory system 110. According to the embodiments of the present disclosure, the memory system 110 and the host 102 may selectively use the methods of transferring the map information described with reference to FIGS. 16 and 17 according to the operating environment.

Figure 18:
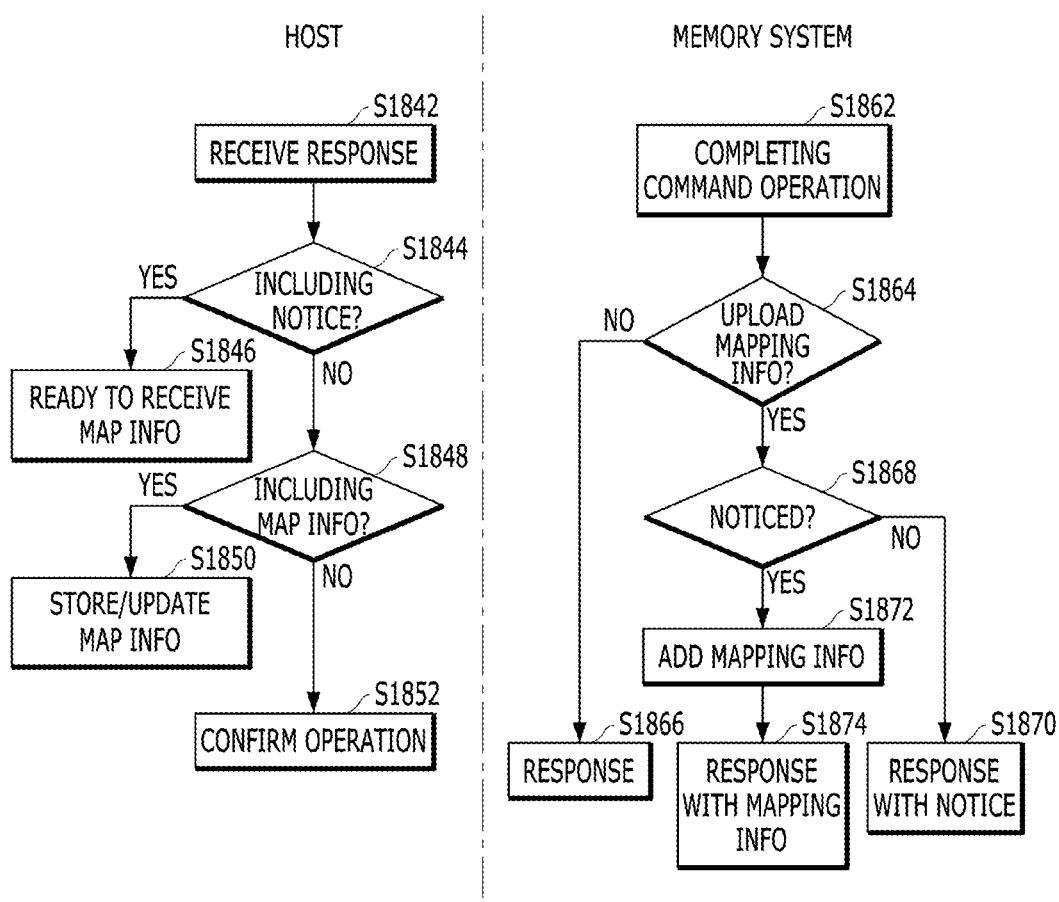
FIG. 18 illustrates a fourth operation of a host and a memory system in accordance with an embodiment of the present disclosure.

FIG. 18 illustrates a fourth operation of the host 102 and the memory system 110 in accordance an embodiment of the present disclosure. To be specific, FIG. 18 illustrates a case in which the memory system 110 transfers map information to the host 102 while the host 102 and the memory system 110 are interlocked.

At S1862, the memory system 110 may complete an operation corresponding to a command COMMAND transferred from the host 102.

After the operation corresponding to the command COMMAND is completed, at S1864, the memory system 110 may check whether there is map information to be transferred to the host 102 or not before transferring a response RESPONSE corresponding to the command COMMAND to the host 102.

When there is no map information to be transferred to the host 102 ('NO' at S1864), at S1866, the memory system 110 may transfer the response RESPONSE that includes information about whether the operation corresponding to the command COMMAND transferred from the host 102 is completed or not (success or failure).

Meanwhile, when the memory system 110 has the map information to be transferred to the host 102 ('YES' at S1864), at S1868, the memory system 110 may check whether a notice for transferring the map information is made or not. Herein, the notice may be similar to the notice described above with reference to FIG. 17.

When the memory system 110 tries to transfer the map information but the memory system 110 has not notify the host 102 of the transfer of the map information in advance ('NO' at S1868), at S1870, the memory system 110 may add the notice to the response RESPONSE and transfer the response RESPONSE to the host 102.

Conversely, when the notice for transferring the map information is already made ('YES' at S1868), at S1872, the memory system 110 may add the map information to the response RESPONSE.

Subsequently, at S1874, the memory system 110 may transfer the response RESPONSE including the map information to the host 102.

At S1842, the host 102 may receive at least one of a response RESPONSE, a response including a notice RESPONSE WITH NOTICE, and a response including map information RESPONSE WITH MAP INFO, transferred from the memory system 110.

At S1844, the host 102 may check whether the received response includes a notice or not.

When the received response includes the notice ('YES' at S1844), at S1846, the host 102 may prepare to receive and store map information that may be transferred later.

Subsequently, at S1852, the host 102 may check a response corresponding to a previous command. For example, the host 102 may check the response to see whether a result of the previous command was a success or failure.

Conversely, when the received response does not include the notice ('NO' at S1844), at S1848, the host 102 may check whether the response includes map information or not.

When the response does not include map information ('NO' at S1848), at S1852, the host 102 may check the response corresponding to the previous command.

Conversely, when the received response includes the map information ('YES' at S1848), at S1850, the host 102 may store the map information included in the response in an internal storage space of the host 102 or update map information that is already stored in the host 102.

The memory system 110 including the map cache 146 in accordance with the embodiment of the present disclosure may store frequently accessed map information or recently accessed map information in the map cache 146. In other words, the memory system 110 may store map information for data frequently or recently subjected to read and write operations in the map cache 146, thereby reducing a burden of loading map information from the memory device 150. The memory system 110 may then provide the host 102 with only map information stored in either the write map cache 830 or the read map cache 850 in the map cache 146. The write map cache 830 and the read map cache 850 may be realized to have different sizes. In particular, the memory system 110 may not provide the host 102 with map information for data onto which a write operation is frequently or recently performed. As a result, the memory system 110 may reduce the burden on the host 102 by reducing an amount of map information provided to the host 102.

According to the embodiments of the present disclosure, a memory system may efficiently search for map information in a map cache, and selectively provide a host with updated map information.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
a memory device configured to store map information; and
a controller configured to store a portion of the map information in a map cache, and access the memory device based on the map information stored in the map cache or access the memory device based on a physical address received together with an access request from a host,
wherein the map cache includes a write map cache configured to store map information corresponding to recently received write commands, and a read map cache configured to store map information corresponding to recently received read commands, the map cache including the write map cache and the read map cache that are separated from each other,
wherein the controller outputs least recently used map information from the read map cache to the host, so that the least recently used map information is stored in the host, and
wherein the host translates a logical address into the physical address based on the least recently used map information stored therein, and transmits the physical address to the controller.

2. The memory system of claim 1, wherein the write map cache and the read map cache store map information based on a Least Recently Used (LRU) scheme, and
wherein the controller moves first map information stored in the write map cache to the read map cache when the first map information is accessed in response to a read command, and moves second map information stored in the read map cache to the write map cache when the second map information is accessed in response to a write command.

3. The memory system of claim 1, wherein, when there is no space to store target map information in the write map cache, the controller evicts least recently used map information among the map information stored in the write map cache to the outside, stores the target map information in the write map cache as the most recently used map information, and deletes the evicted map information.

4. The memory system of claim 1, wherein, when target map information corresponding to a read command is stored in the read map cache, the controller stores the target map information in the read map cache as the most recently used map information.

5. The memory system of claim 1, wherein, when target map information corresponding to a write command is stored in the write map cache, the controller stores the target map information in the write map cache as the most recently used map information.

6. The memory system of claim 1, wherein, when there is no space to store target map information in the read map cache and the target map information corresponding to a read command is stored in the write map cache, the controller outputs the least recently used map information among the map information stored in the read map cache to the host, stores the target map information moved from the write map cache in the read map cache as the most recently used map information.

7. The memory system of claim 1, wherein, when there is no space to store target map information in the write map cache and target map information corresponding to a write command is stored in the read map cache, the controller evicts least recently used map information among the map information stored in the write map cache to the outside, stores the target map information moved from the read map cache in the write map cache as the most recently used map information, and deletes the evicted map information.

8. The memory system of claim 1, wherein the write map cache and the read map cache store map information based on a Least Frequently Used (LFU) scheme, and
    wherein the controller moves first map information stored in the write map cache to the read map cache when the first map information is accessed in response to a read command, and moves second map information stored in the read map cache to the write map cache when the second map information is accessed in response to a write command.

9. A method for operating a memory system, the method comprising:
    storing map information in a memory device; and
    storing a portion of the map information in a map cache;
    accessing the memory device based on the map information stored in the map cache or accessing the memory device based on a physical address received together with an access request from a host;
    storing map information corresponding to a write operation in a write map cache when the access request is for the write operation, and storing map information corresponding to a read operation in a read map cache when the access request is for the read operation, the map cache including the write map cache and the read map cache that are separated from each other; and
    outputting least recently used map information from the read map cache to the host, so that the least recently used map information is stored in the host,
    wherein the host translates a logical address into the physical address based on the least recently used map information stored therein, and transmits the physical address to the memory system.

10. The method of claim 9, wherein the write map cache and the read map cache operate based on a Least Recently Used (LRU) scheme, and the method further comprises:
    moving first map information stored in the write map cache to the read map cache when the first map information is accessed in response to a read command; and
    moving second map information stored in the read map cache to the write map cache when the second map information is accessed in response to a write command.

11. The method of claim 9, wherein, when there is no space to store target map information in the write map cache, the method further comprises:
    evicting least recently used map information among the map information stored in the write map cache to the outside;
    storing the target map information in the write map cache as the most recently used map information; and
    deleting the evicted map information.

12. The method of claim 9, further comprising:
    when target map information corresponding to a read command is stored in the read map cache,
    storing the target map information in the read map cache as the most recently used map information.

13. The method of claim 9, further comprising:
    when target map information corresponding to a write command is stored in the write map cache,
    storing the target map information in the write map cache as the most recently used map information.

14. The method of claim 9, further comprising:
    when there is no space to store target map information in the read map cache and the target map information corresponding to a read command is stored in the write map cache,
    outputting the least recently used map information among the map information stored in the read map cache to the host; and
    storing the target map information moved from the write map cache in the read map cache as the most recently used map information.

15. The method of claim 9, further comprising:
    when there is no space to store target map information in the write map cache and the target map information corresponding to a write command is stored in the read map cache,
    evicting least recently used map information among the map information stored in the write map cache to the outside;
    storing the target map information moved from the read map cache in the write map cache as the most recently used map information; and
    deleting the evicted map information.

16. The method of claim 9, wherein the write map cache and the read map cache operate based on a Least Frequently Used (LFU) scheme, and the method further comprises:
    moving first map information stored in the write map cache to the read map cache when the first map information is accessed in response to a read command; and
    moving second map information stored in the read map cache to the write map cache when the second map information is accessed in response to a write command.

17. A data processing system, comprising:
    a memory system configured to store map information and access user data based on the map information; and
    a host configured to receive the map information from the memory system, store the received map information in a host memory, and provide the memory system with an access request based on the map information,
    wherein the memory system comprises:
        a map cache; and
        a controller configured to store a portion of the map information,
        wherein the map cache includes a write map cache configured to store map information corresponding to recently received write commands, and a read map cache configured to store map information corresponding to recently received read commands, the write map cache being separated from the read map cache,
        wherein the controller outputs least recently used map information from the read map cache to the host, so that the least recently accessed map information is stored in the host, and
        wherein the host translates a logical address into a physical address based on the least recently accessed map information stored therein, and transmits the physical address together with the access request to the controller.

18. The data processing system of claim 17, wherein the write map cache and the read map cache store map information based on a Least Recently Used (LRU) scheme, and wherein the controller moves first map information stored in the write map cache to the read map cache when the first map information is accessed in response to a read command, and moves second information stored in the read map cache to the write map cache when the second map information is accessed in response to a write command.

* * * * *